US010158925B2

(12) United States Patent
Thompson et al.

(10) Patent No.: US 10,158,925 B2
(45) Date of Patent: Dec. 18, 2018

(54) TECHNIQUES FOR BACKFILLING CONTENT

(71) Applicants: David S. Thompson, Spokane, WA (US); David A. Divine, Spokane, WA (US)

(72) Inventors: David S. Thompson, Spokane, WA (US); David A. Divine, Spokane, WA (US)

(*) Notice: Subject to any disclaimer, the term of this patent is extended or adjusted under 35 U.S.C. 154(b) by 268 days.

(21) Appl. No.: 14/828,519

(22) Filed: Aug. 18, 2015

(65) Prior Publication Data

US 2015/0358690 A1 Dec. 10, 2015

Related U.S. Application Data

(63) Continuation-in-part of application No. 14/550,906, filed on Nov. 21, 2014, now Pat. No. 9,138,652, (Continued)

(51) Int. Cl.
*G06Q 30/02* (2012.01)
*H04L 29/06* (2006.01)
(Continued)

(52) U.S. Cl.
CPC ..... *H04N 21/8126* (2013.01); *G06Q 30/0241* (2013.01); *H04L 65/602* (2013.01);
(Continued)

(58) Field of Classification Search
CPC ......... H04N 21/25891; H04N 21/4755; H04N 21/812; H04N 21/84; H04N 21/8549; G06Q 30/0241; H04L 65/602
(Continued)

(56) References Cited

U.S. PATENT DOCUMENTS 8,631,431 B2 * 1/2014 Berberet ............ H04N 7/17336
725/32
2002/0194595 A1 * 12/2002 Miller .................... H04H 20/10
725/36
(Continued)

OTHER PUBLICATIONS

International Search Report for PCT Application No. PCT/US2014/039253, dated Oct. 16, 2014, 7 pages.
(Continued)

*Primary Examiner* — Nathan J Flynn
*Assistant Examiner* — Caroline Somera

(57) ABSTRACT

A user (e.g., a viewer of audio/video content) may select a primary or main content stream (MCS). Metadata regarding the MCS may be generated to indicate a start and a stop within the MCS of content that is not of interest to the user, such as commercials. When the MCS (e.g., a sporting event) provides undesired content, backfill content (BFC) may be provided in place of the undesired content. BFC may include content provided by a fantasy sports platform, a social media website, an email provider, a secondary content stream (e.g., highlights from a different sporting event), and/or any other content. The MCS may be presented to the user with a slight time-delay, so that the metadata identifying commercials may be determined, and to allow the primary stream to be blended seamlessly with BFC. In another example, BFC may include a second game, provided to the user's device and segmented into highlights.

19 Claims, 18 Drawing Sheets

Related U.S. Application Data which is a continuation-in-part of application No. 14/285,607, filed on May 22, 2014, now Pat. No. 9,056,253.

(60) Provisional application No. 62/180,606, filed on Jun. 17, 2015, provisional application No. 62/116,801, filed on Feb. 16, 2015, provisional application No. 61/862,089, filed on Aug. 5, 2013, provisional application No. 61/826,485, filed on May 22, 2013.

(51) Int. Cl.
  *H04N 21/81* (2011.01)
  *H04N 21/84* (2011.01)
  *H04N 21/258* (2011.01)
  *H04N 21/475* (2011.01)
  *H04N 21/8549* (2011.01)

(52) U.S. Cl.
  CPC ... *H04N 21/25891* (2013.01); *H04N 21/4755* (2013.01); *H04N 21/812* (2013.01); *H04N 21/84* (2013.01); *H04N 21/8549* (2013.01)

(58) Field of Classification Search
  USPC .......................................... 725/34
  See application file for complete search history.

(56) References Cited

U.S. PATENT DOCUMENTS

| | | | |
|---|---|---|---|
| 2003/0115595 A1* | 6/2003 | Stevens | H04N 7/163 725/32 |
| 2005/0076362 A1 | 4/2005 | Dukes et al. | |
| 2007/0113250 A1 | 5/2007 | Logan et al. | |
| 2008/0064490 A1* | 3/2008 | Ellis | H04N 5/44543 463/25 |
| 2008/0201289 A1 | 8/2008 | Loponen et al. | |
| 2008/0297669 A1* | 12/2008 | Zalewski | H04N 7/163 348/844 |
| 2010/0179867 A1* | 7/2010 | Hughes | G06Q 10/02 705/14.5 |
| 2010/0211465 A1 | 8/2010 | Hughes et al. | |
| 2013/0014171 A1* | 1/2013 | Sansom | G06F 17/3082 725/52 |
| 2013/0290110 A1 | 10/2013 | LuVogt et al. | |
| 2013/0290339 A1 | 10/2013 | LuVogt et al. | |
| 2013/0290905 A1 | 10/2013 | LuVogt et al. | |
| 2014/0068662 A1* | 3/2014 | Kumar | H04N 21/23424 725/34 |
| 2014/0115631 A1* | 4/2014 | Mak | H04N 21/23424 725/42 |
| 2014/0149596 A1* | 5/2014 | Emerson, III | H04L 67/10 709/231 |
| 2014/0373054 A1* | 12/2014 | Edwards | H04N 21/458 725/37 |

OTHER PUBLICATIONS

U.S. Appl. No. 14/285,607, filed May 22, 2014, entitled "Fantasy Sports Interleaver," 163 pages (App+Drawings).
Office Action dated Feb. 23, 2015, from U.S. Appl. No. 14/285,607, filed May 22, 2014, entitled "Fantasy Sports Interleaver," 10 pages.
U.S. Appl. No. 14/550,906, filed Nov. 21, 2014, entitled "Fantasy Sports Integration with Video Content," 200 pages (App+Drawings).
Office Action dated Feb. 11, 2015, from U.S. Appl. No. 14/550,906, filed Nov. 21, 2014, entitled "Fantasy Sports Integration with Video Content," 10 pages.

* cited by examiner

SELECT ONE OR MORE BACKFILL CONTENT PROVIDERS
400

- ☐ YAHOO! — 402
- ☐ YOUTUBE — 404
- ☐ FACEBOOK — 406
- ☐ TWITTER — 408
- ☐ GMAIL — 410
- ☐ MOVIE TRAILERS — 412
- ☐ FARM WEATHER AND PRICES UPDATE — 414
- ☐ AUTHOR RACHEL TOOR BOOKS/COLUMNS — 416
- ☐ WEATHER UPDATE — 418
- ☐ SOCIAL MEDIA — 420
- ☐ NEWS ROOM NEWS FLASH — 422
- ☐ APPS — 424
  - ☐ SOCIAL APP — 426
  - ☐ PHOTO APP — 428
  - ☐ MUSIC APP — 430
  - ☐ DATING APP — 432
  - ☐ OTHER APPS, ETC. — 434
- ☐ OTHER BACKFILL CONTENT PROVIDERS — 436

FIG. 4

SELECT AND PRIORITIZE BACKFILL CONTENT
1100

- ☐ FANTASY ATHLETE PLAYER8, SCORES TD — 1102
- ☐ FANTASY ATHLETE PLAYER5, 2 YD. RUN — 1104
- ☐ TWITTER FEED UPDATE — 1106
- ☐ FAVORITE TEAM PLAYER7, 14 YD PASS — 1108
- ☐ FANTASY ATHLETE PLAYER1, TACKLE — 1110
- ☐ FAVORITE ATHLETE PLAYER8, 8 YD CATCH — 1112
- ☐ FANTASY ATHLETE PLAYER5, 4 YD RUN — 1114
- ☐ CHANNEL 6 WEATHER REPORT — 1116
- ☐ FAVORITE TEAM PLAYER12, TACKLE — 1118
- ☐ AUTHOR RACHEL TOOR, BOOK PREVIEW — 1120
- ☐ FAVORITE ATHLETE PLAYER8, 8 YD PASS — 1122
- ☐ FANTASY ATHLETE PLAYER5, 6 YD CATCH — 1124
- ☐ NATIONAL NEWS, FIRST 3 MINUTES — 1126
- ☐ FAVORITE TEAM PLAYER7, BLOCKS PUNT — 1128
- ☐ FACEBOOK UPDATE — 1130

FIG. 11

SELECT BACKFILL CONTENT FROM ANOTHER USER'S BUFFER
1200

- ☐ FANTASY ATHLETE PLAYER6, SCORES TD — 1202
- ☐ FAVORITE ATHLETE PLAYER8, 9 YD. RUN — 1204
- ☐ FAVORITE ATHLETE PLAYER2, 6 YD CATCH — 1206
- ☐ FAVORITE TEAM PLAYER7, 14 YD PASS — 1208
- ☐ FANTASY ATHLETE PLAYER1, TACKLE — 1210
- ☐ TWITTER FEED UPDATE — 1212
- ☐ FACEBOOK UPDATE — 1214
- ☐ CHANNEL 2 FIRST FIVE MINUTES — 1216
- ☐ FAVORITE TEAM PLAYER7, FIELD GOAL — 1218
- ☐ CABLE NEWS SHORT REPORT — 1220
- ☐ FAVORITE ATHLETE PLAYER8, 8 YD PASS — 1222
- ☐ WALL STREET WRAP UP — 1224
- ☐ NATIONAL NEWS, FIRST 3 MINUTES — 1226
- ☐ FAVORITE TEAM PLAYER1, 40 YD PUNT — 1228
- ☐ FARM MINUTE — 1230

FIG. 12

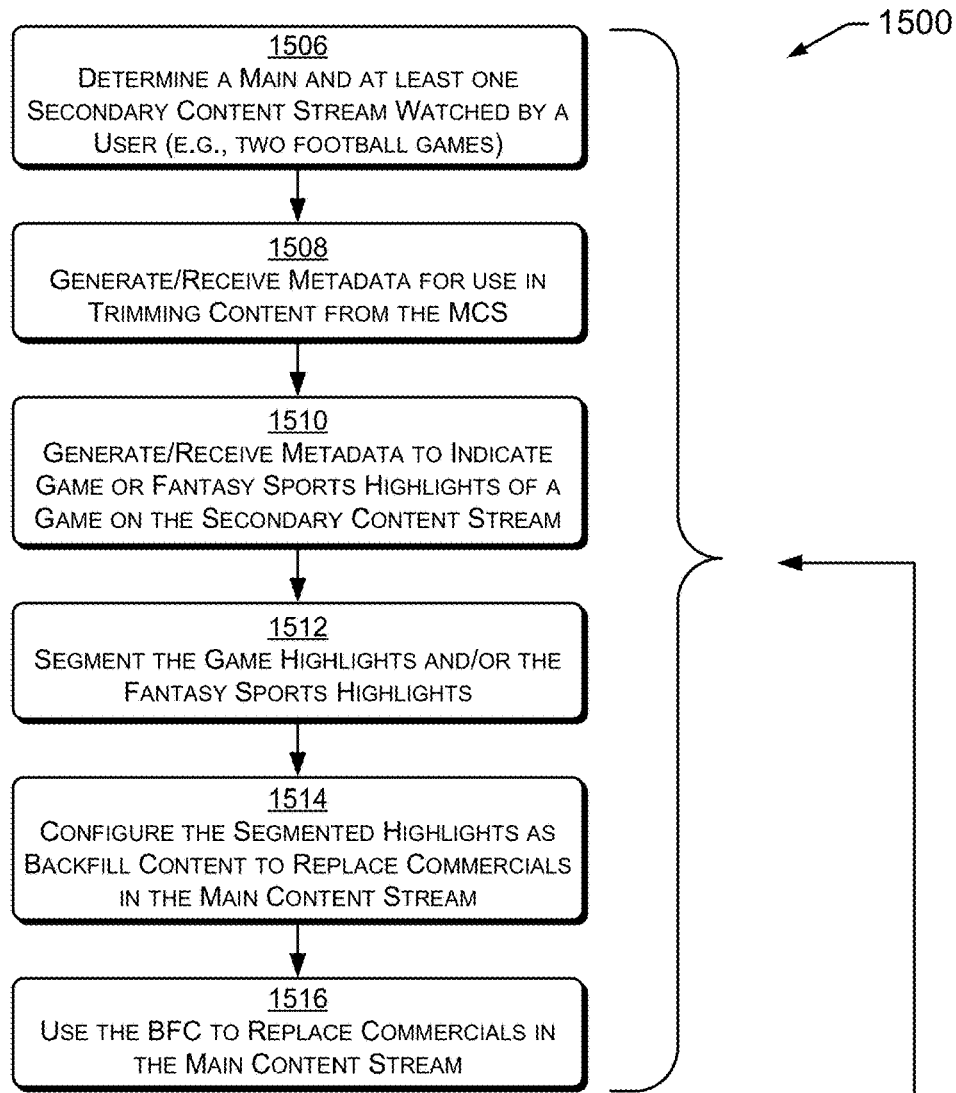
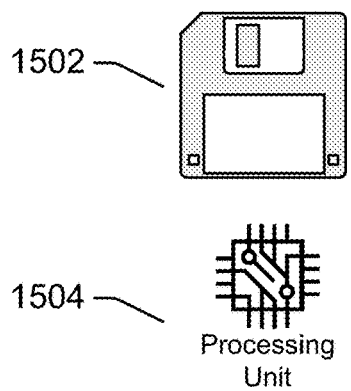
FIG. 15

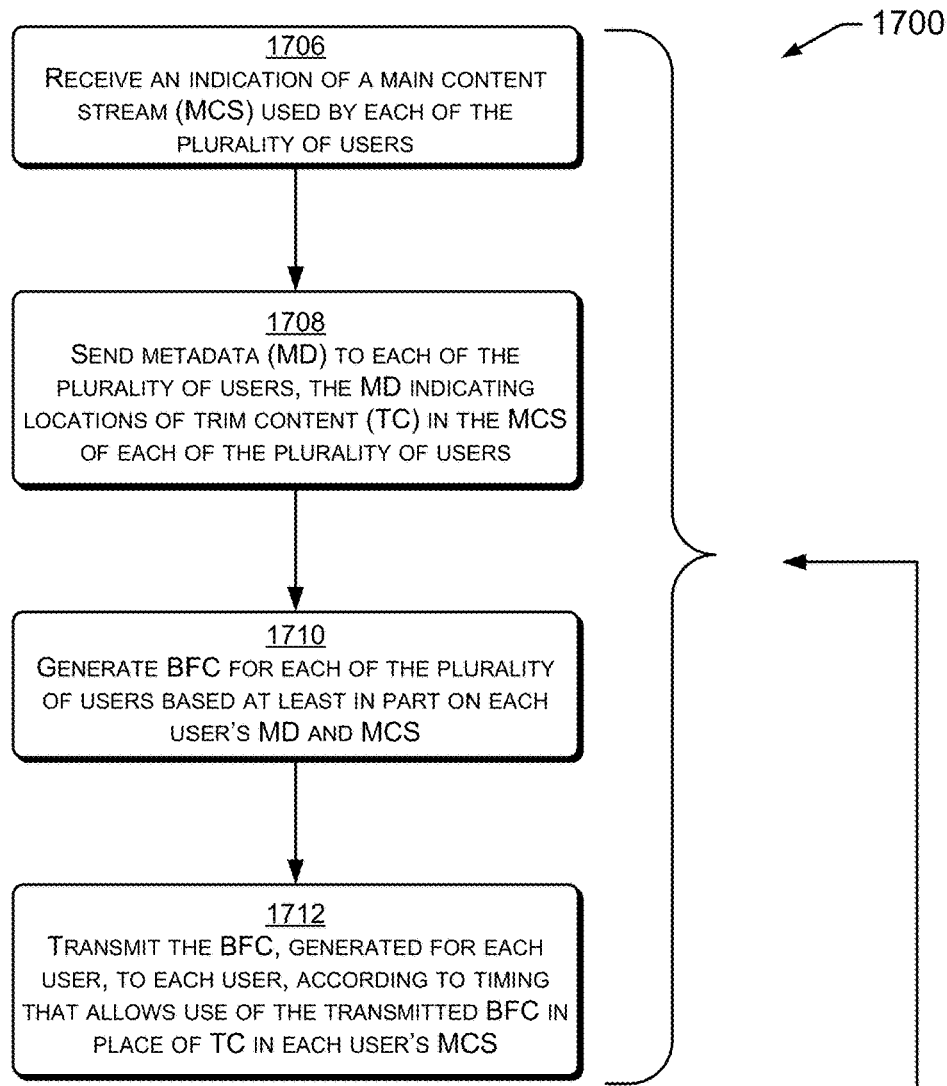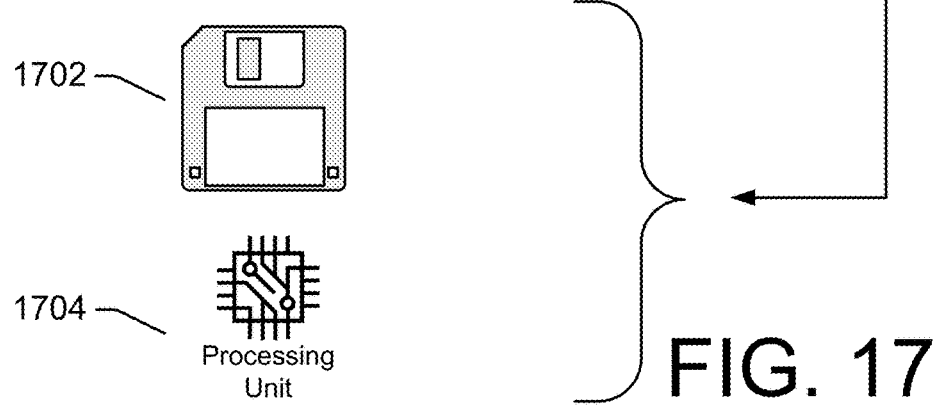
FIG. 17

TECHNIQUES FOR BACKFILLING CONTENT

This patent application claims the benefit of priority to U.S. Provisional Patent Application No. 62/180,606, filed on Jun. 17, 2015, and U.S. Provisional Patent Application No. 62/116,801, filed on Feb. 16, 2015, both of which are incorporated herein by reference. This patent application is also a continuation-in-part of U.S. Non-provisional patent application Ser. No. 14/550,906, filed on Nov. 21, 2014, which is a continuation-in-part of U.S. Non-provisional patent application Ser. No. 14/285,607, filed on May 22, 2014 (now U.S. Pat. No. 9,056,253), which claims the benefit of priority to U.S. Provisional Patent Application No. 61/862,089, filed on Aug. 5, 2013, and U.S. Provisional Patent Application No. 61/826,485, filed on May 22, 2013, all of which are also incorporated herein by reference.

BACKGROUND

Television viewers have a number of ways to avoid commercials and other content that they are not interested in watching (collectively, "commercials"). One strategy is to change to a second channel when a commercial is presented on a first channel and then to return to the first channel when the commercial is probably over or almost over. Picture-in-picture is a technology that assists in this process. Another strategy is to record the program on the first channel, and then at a later time the user can advance (or fast forward) through the commercials in rapid steps while watching the previously recorded program.

Sporting events provide particular challenges, because channel changing during commercials entails some risk of missing an important play, and because watching a recording of the sporting event after it has concluded is generally unsatisfying.

Fantasy sports platforms—such as those provided by Yahoo! and other Internet services—provide athlete and point information to fantasy team owners and support the operation of millions of fantasy sports leagues. Most players access their fantasy sports team information by use of a laptop or mobile device. Accordingly, fantasy sports platforms have adapted their content for display on such devices.

However, there has been a failure of existing technology to provide a unified user experience to sports fans watching television and sports fans utilizing Internet-based fantasy sports platforms. The failure is compounded because sports fans must utilize various devices to keep current with various professional sports and fantasy sports interests, and must watch unwanted commercial messages while doing so.

BRIEF DESCRIPTION OF DRAWINGS

FIG. 4 is a diagram showing an example user interface configured to obtain information to allow a determination of what backfill content provider(s) a user would prefer to utilize and to illustrate underlying techniques of backfill content, metadata and other tools.

FIG. 11 is a diagram showing an example user interface to allow a user to select and prioritize BFC for later use and to illustrate underlying techniques of backfill content, metadata and other tools.

FIG. 12 is a diagram showing an example user interface to allow one user to access a listing of BFC available from friend(s), to pull content data files and/or links to content from the friends' device(s) to the user's device(s) and to illustrate underlying techniques of backfill content, metadata and other tools.

FIG. 15 is a flow diagram showing an example method by which metadata is used to segment a content stream available to a user (e.g., a television channel the user is not primarily watching) into backfill content. In an example, a sporting event, such as a football game on a second station, may be segmented to provide highlights or fantasy sports highlights to be provided as backfill content to replace commercials in a primary content stream (e.g., live sporting event) that the user is watching on a first station.

FIG. 17 is a flow diagram showing another example method by which metadata and backfill content may be created, transmitted and/or utilized.

DETAILED DESCRIPTION

Overview

Figure 1:
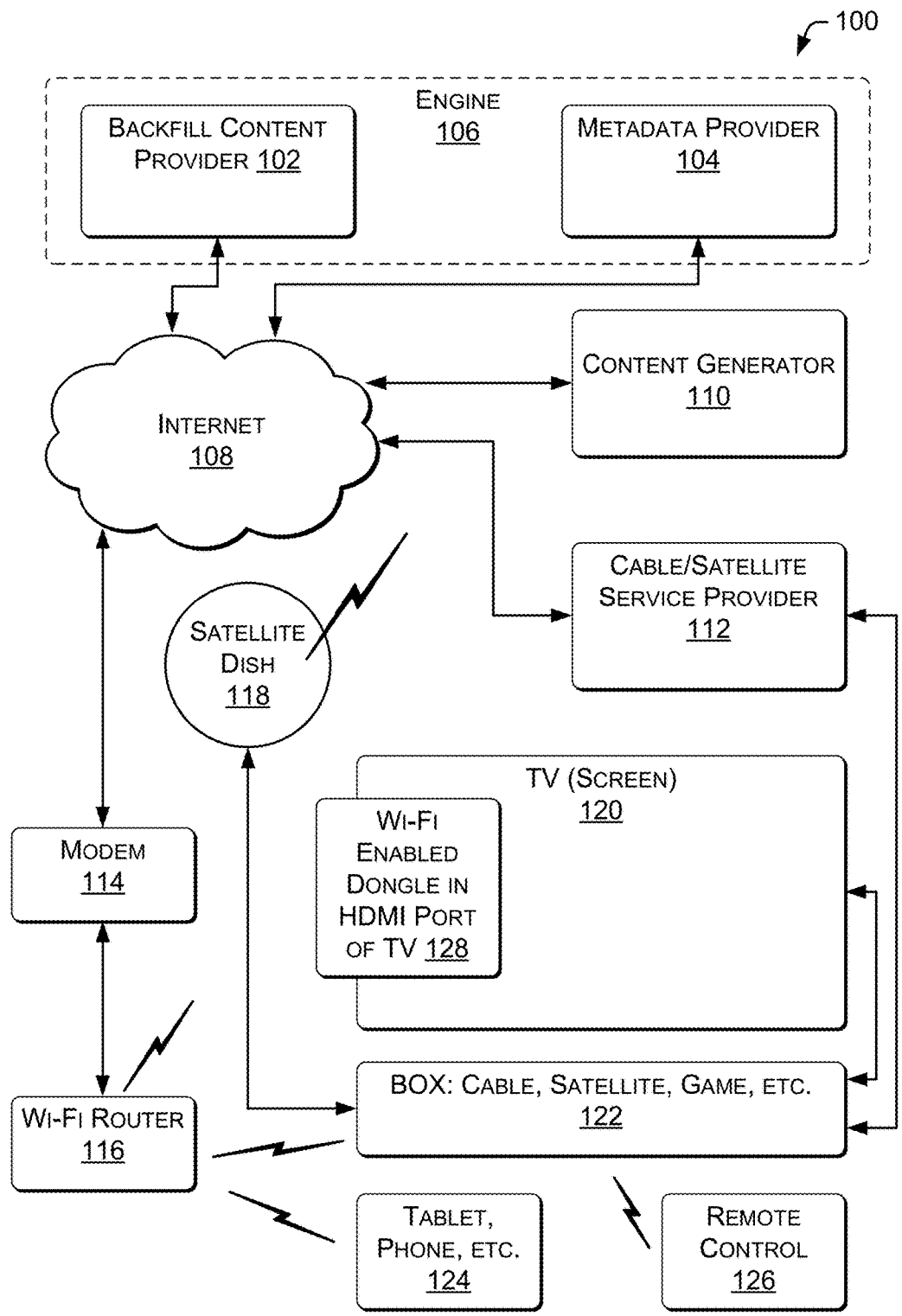
FIG. 1 is a diagram showing an example configuration of a system including a content generator, a content provider, a metadata provider, a backfill content (BFC) provider, the Internet, and a user having a television (TV), a set top box, game console, Wi-Fi, and one or more mobile devices.

In an example illustrating backfill content together with systems and methods of its use, a user selects a primary content stream or main content stream (PCS or MCS, e.g., a televised sporting event or other TV show, broadcast or single cast). The MCS may be of a live event (e.g., sporting event, awards show, or the like), pre-recorded content, or on-demand content. Metadata may be generated to indicate locations of commercials and/or undesirable content ("trim content") within the MCS. The metadata may identify a start and an end of the trim content (e.g., commercial), e.g., by start and end times in the MCS, by a frame that starts or ends the commercial or the undesirable content, or by other means. The metadata indicating the trim content may be generated by the user's device, a remotely located metadata server/provider or other computing device. In one example, a metadata server/provider may receive television feeds from many networks in many marketing areas, and provide metadata to users of those networks in those markets.

Automated and/or manual methods may be used to identify the start and end points of commercials or other unwanted trim content. In one example, an application may be operated on a device of the user (e.g., the user's TV, cable box, satellite receiver, game console, media player, etc.) or may be operated on a server or engine in a location remote from the user. The application may identify the trim content by any of several methods, such as comparison of audio and/or video in the MCS to an evolving database of known commercials. In some examples, the application may compare portions or samples of the MCS, or hashes thereof, to the database of commercials (or hashes of commercials). Alternatively or additionally, the trim content may be identified by known times (e.g., based on a schedule provided by a provider or broadcaster of the content) or signals indicating commercial messages (e.g., signals embedded in, appended to, or associated with the MCS). Alternatively or additionally, the trim content may be identified by operation of a game clock, statements of announcers or other television personalities, and/or other means. Alternatively or additionally, the trim content may be identified by humans (e.g., by administrators and/or users) using techniques, such as those described in U.S. patent application Ser. Nos. 14/550,906 and 14/285,607, for segmenting and annotating segments of content.

In some examples, trim content may be identified in programming provided by broadcast (RF, satellite and/or cable) stations, in On-Demand programming and/or in Internet-based programming. The commercials or other trim content may be identified by any of a number of methods, such as examination of video buffers or pipelines by an application running in parallel to those applications operating to provide the programming, at either the local (user) level or the remote (server/cloud/engine) level. An application on the local (user) level and/or the server/cloud/engine level may be configured to determine a market, location and/or city, a station, channel number and/or network used by a user. The application may be operated on a TV, cable box, game console or other device of the user, and may provide the channel and/or network of the user to the engine.

While the MCS is broadcasting commercial(s), backfill content (BFC), which may be provided by one or more BFC providers, is displayed by the user's device as a substitute for the commercial(s). The BFC may, or may not, be fantasy sports related. In a particular illustration of the example, the user watches a football, soccer, basketball, baseball, or hockey game, an auto race, a boxing or martial arts match, or the like, on a primary content stream, such as by use of a cable- or satellite- or Internet-based provider using single-cast or multicast techniques, or by receipt of an over-the-air broadcast. When metadata indicates that the MCS has gone (or will go) to a commercial, the user's device recognizes the existence of the commercial and instead presents backfill content to the user in lieu of the primary content. In some examples, the backfill content may originate from a fantasy sports platform or other BFC provider, and may include audio/video segments of one or more sporting events (e.g., games, matches, races, etc.). The segments may show athletes of interest to the user. The segments may show athletes' performances for which fantasy points were awarded. The segments may show athletes' performances for which fantasy points were awarded to athletes of interest to the user. In some examples, the user may watch the MCS with a slight delay (e.g., the stream is buffered, and the user watches content after it has been buffered for a few milliseconds or seconds). Such a short delay allows generation of the metadata indicating commercials or other trim content to be removed from the MCS. The metadata may be used in determining the timing and quantity of backfill content to replace the commercial(s) or other trim content removed from the MCS. Such a slight delay prevents display of the first milliseconds or seconds of commercial(s) or other trim content, but does not substantially impact the user's enjoyment of the MCS. For instance, the delay is short enough that an outcome of the MCS (e.g., sporting event) or even a next portion (e.g., next play of the sporting event) will be provided to the user by the MCS before other sources have a chance to do so.

In some examples, some or all of the delay may result if the presentation of backfill content is allowed to overrun the end of the commercial set. This delay in presentation of the MCS may be reduced by sending less backfill content to replace the next commercial set. Accordingly, in some examples, the user is able to integrate broadcast media of professional/college sports with Internet media fantasy sports in a manner that does not present commercials. Additionally, the user is able to integrate broadcast media of any type of television programming and any type of BFC (e.g., provided by the Internet and/or another channel or content source) in a manner that does not present commercials.

Thus, multiple backfill content providers may provide backfill content to a plurality of users. Similarly, users may select from among BFC providers and from among the offerings of each BFC provider. The BFC providers may generate customized BFC to be sent to each of a plurality of users. The BFC may be provided to client devices of the users directly or via a third party service (e.g., a BFC aggregator or distributor). The BFC providers may provide BFC to each user, either buffered for later use or in real time for immediate use, that is based at least in part on what television or other programming the user is watching, and what network and what cable/satellite/Internet-based or other provider provides the programming.

Example Systems

FIG. 1 shows an example configuration of a system 100 including a content generator, a content provider, a metadata provider, a backfill content provider, the Internet, and a user having a television (TV), a set top box, game console, Wi-Fi router or other access point, and one or more mobile devices. In one example, the BFC provider provides fantasy sports related BFC to users, which they watch or otherwise consume during the commercials of sporting events broadcast by the content generators (e.g., television networks) through the cable/satellite/Internet-based provider. A metadata provider provides commercial start/end timing information of at least one/many/most television networks/providers/markets, allowing users to transition seamlessly (i.e., typically without watching commercial fragments) between a main content stream and BFC without user input to initiate the transition. The metadata provider may also provide other information about the sporting events, such as start/end timing information of plays (or portions of plays), beginnings and endings of periods (e.g., quarters, halves, etc.), huddles, timeouts, analyst commentary, athlete interviews, sideline reporting, cheerleader coverage, penalties, official commentary, instant replays, booth reviews, pre game shows or activities, post game shows, coin flip, tip off, at-bats, etc. In addition to providing start and/or end times for various events, the metadata providers may additionally or alternatively provide information about the game or event, such as a score, a time on the time clock, a strike count, down and yardage to go, quarter, period, inning, player fouls or penalties, punches landed, or the like, which may be correlated with the content of the sporting events or other program. The metadata may provide information describing what is happening in the sporting event or other program.

One or more backfill content providers 102 are configured to provide BFC (e.g., audio/video clips) through the Internet or other network to one or more users. The BFC providers 102 may provide clips to satisfy users having a variety of interests. The BFC providers 102 may provide clips of different lengths for use by users having commercial breaks (or other trimmed content) of different lengths. The BFC providers may receive metadata from metadata providers 104 indicating a length of BFC needed or desired by each of a plurality of users, and a time by which the BFC is needed by each user. The length of BFC needed may be determined based on the metadata associated with the sporting event or other content and based on one or more explicit or implicit preferences or settings of the user. The BFC providers may stream BFC to users to be buffered for immediate or delayed use.

The backfill content may be any content desired by users, including other sporting events (or clips or portions thereof), television programs, music, music videos, movie trailers, weather reports, news headlines, sports news, social media (Facebook, Twitter, etc.), applications of many kinds (photo sharing, dating, travel, email, etc.). In some examples, the BFC may include commercials or ads. In some examples, the BFC may be interactive and may allow a user to provide inputs, make selections, browse content, play games, use email, use social media, respond to questions, or the like.

In some examples, the BFC may also be fantasy sports related. In one example, a BFC provider may receive audio/video feeds from a plurality of games or sporting events (e.g., professional or collegiate football, baseball, basketball, soccer, hockey, boxing, martial arts, auto racing, bicycle racing, golf, etc.). The feeds may be segmented into plays or other segments, and annotated to indicate fantasy sports points awarded to particular athletes within each segment. Segments appropriate for each user (e.g., based on the athletes depicted in the segments and fantasy points for events depicted in the segments) may be configured as BFC for that user. Thus, each user receives BFC that is customized for the particular user based on the user's interests and preferences, which may have been specified explicitly by the user or implicitly by inference from user activity, viewing history, or the like. Continuing the fantasy sports example, the BFC supplied to each user may include audio/video clips (hereinafter video clip or clip) that are relevant to the user's fantasy team, fantasy opponent, fantasy league, or other interests and/or interest information (e.g., favorite athletes, favorite teams, plays of interest, etc.). Thus, for example, the BFC provided to each user may allow the user to watch the plays for which the user's fantasy team was awarded points. By extension, the user may watch other clips for which other fantasy teams were awarded points, such as those in which the user has interest.

One or more metadata providers 104 may receive feeds from one or more networks through one or more providers. The metadata providers 104 may scan the incoming feeds and determine the start and end points of commercials and other content. This functionality may be performed in an automated or manual manner. The metadata providers 104 may provide the metadata to BFC providers 102 and/or to the devices 122 of end users.

In another example, content generators 110 and/or service providers 112 (e.g., cable or satellite providers) may provide some or all of the metadata to a plurality of users' devices directly and/or to one or more metadata providers 104. In this example, the metadata provider 104 may receive content feeds from each of a plurality of networks directly or via the plurality of service providers 112 (e.g., cable and satellite companies). The content feeds may include at least some metadata describing the content feeds (e.g., name of program, teams competing in sporting event, etc.). In some examples, the content feeds may also be annotated with the start and finish times of various portions of the content. Using the received feeds, the metadata provider 104 may determine the start and finish times of portions of the content. As noted above, in some examples, the metadata may include start and finish times (or other identifying data, such as anchor frames, etc.) to identify portions of the content that are objectionable to users (e.g., commercials). The metadata provider(s) 104 may provide the metadata to BFC providers and/or to end users. In some examples, the BFC providers may size and time BFC transmissions to each user based in part on the metadata. In other examples, a client device of the user (e.g., computer, tablet, phone, gaming console, media player, etc.) may determine the appropriate size and content of the BFC to fill the undesirable period of content in the MCS, based on the metadata. The user's device may break away from the main content stream as it goes to commercial, based at least in part on the incoming metadata. If the user is watching the MCS with a slight delay, the user's device may seamlessly transition between the MCS and the BFC. If the user is watching the MCS in realtime (i.e., without a slight delay) the user may still be transitioned between MCS and the BFC, but the transition may be slightly delayed (e.g., milliseconds or seconds of a commercial may be visible) due to delayed reception and processing of the metadata.

In a further example of metadata and metadata providers 104, the user may have two or more sporting or other events available for viewing at the same time (e.g., football games on more than one cable/satellite/RF broadcast/Internet-based channel). The user may watch one sporting event as the MCS and may watch the second sporting event as BFC during commercials (and/or undesirable periods) in the MCS. In some examples, the metadata provider may provide the user's device (TV app, game console, media player, etc.) with metadata that allows the user's device to segment programming (e.g., a second football game) and to thereby separate highlights or fantasy sports highlights for use as BFC to the main content stream (e.g., the football game of most interest). The highlights may be of a general nature, or may be related to a fantasy sports team or league. The highlights may be generated by the user's device based on one or more explicit and/or implicit preferences or settings. In other examples, a third party BFC provider (or the service provider) may segment the second sporting event and provide it to the user's device as already-segmented BFC.

An engine 106 may be configured to include a server farm or other computer installation having the ability to host a number of BFC providers 102 and/or metadata providers 104. Thus, within the engine 106, metadata providers 104 may receive feeds from many television networks and/or cable providers and create metadata indicating commercial timing and other things. The BFC providers 102 may send customized (possibly unique) BFC to each of a plurality of users, of duration and timing indicated by the metadata. Alternatively, the BFC providers 102 may provide BFC to users without regard to duration, and the user's device may employ an appropriate portion of the BFC to fill the openings in the MCS based on the metadata.

The Internet 108 and/or other network may be used to connect a number of components described in FIG. 1. A content generator 110 may generate television programming, such as sporting events, dramas, movies, game shows, reality shows, etc. Examples of content generators include the television networks NBC, CBS, ABC, FOX, ESPN, Telemundo, their affiliate and subsidiary networks, as well as providers of content over the internet such as Netflix, Amazon, Hulu, Yahoo!, and others. Content generators may also include the companies and studios that actually record and produce the content. The content generator 110 may deliver the generated content by operation of a cable, satellite, Internet, or other service provider 112. Example service providers include Comcast, Dish Network, Direct TV, AT&T, Verizon, to name just a few.

By way of example, in one scenario, a user may connect to the Internet 108 with a modem 114 and may utilize a Wi-Fi router 116 within the user's residence to provide a communication connection. The user may have a satellite dish antenna 118 or connection to a cable provider. The user may have one or more televisions 120, a remote control 126, and one or more cable boxes, satellite receivers, DVD players, Blu-Ray players, game consoles, media players (e.g., Roku, Chromecast, Amazon Fire TV, etc.), or other devices (collectively and generically referred to as "boxes 122"). Such boxes 122 may include one or more communication connections to the Internet, cable networks, satellites, telephone networks, or other public or private networks to receive BFC. Such boxes 122 may also include a port or output to output the BFC for display on the TV. Example game consoles include Xbox, PlayStation, Nintendo, and others. The user may have a tablet 124, phone, laptop, or other Internet-connected devices. The user may have a media player such as a Wi-Fi enabled dongle 128 connected to an HDMI or other audio/video port of the TV 120. The dongle 128 and/or one of the boxes 122 may be used to receive BFC (e.g., over Wi-Fi or other communication connection to the internet) and provide that content to an HDMI (or other) port in the TV 120.

Figure 2:
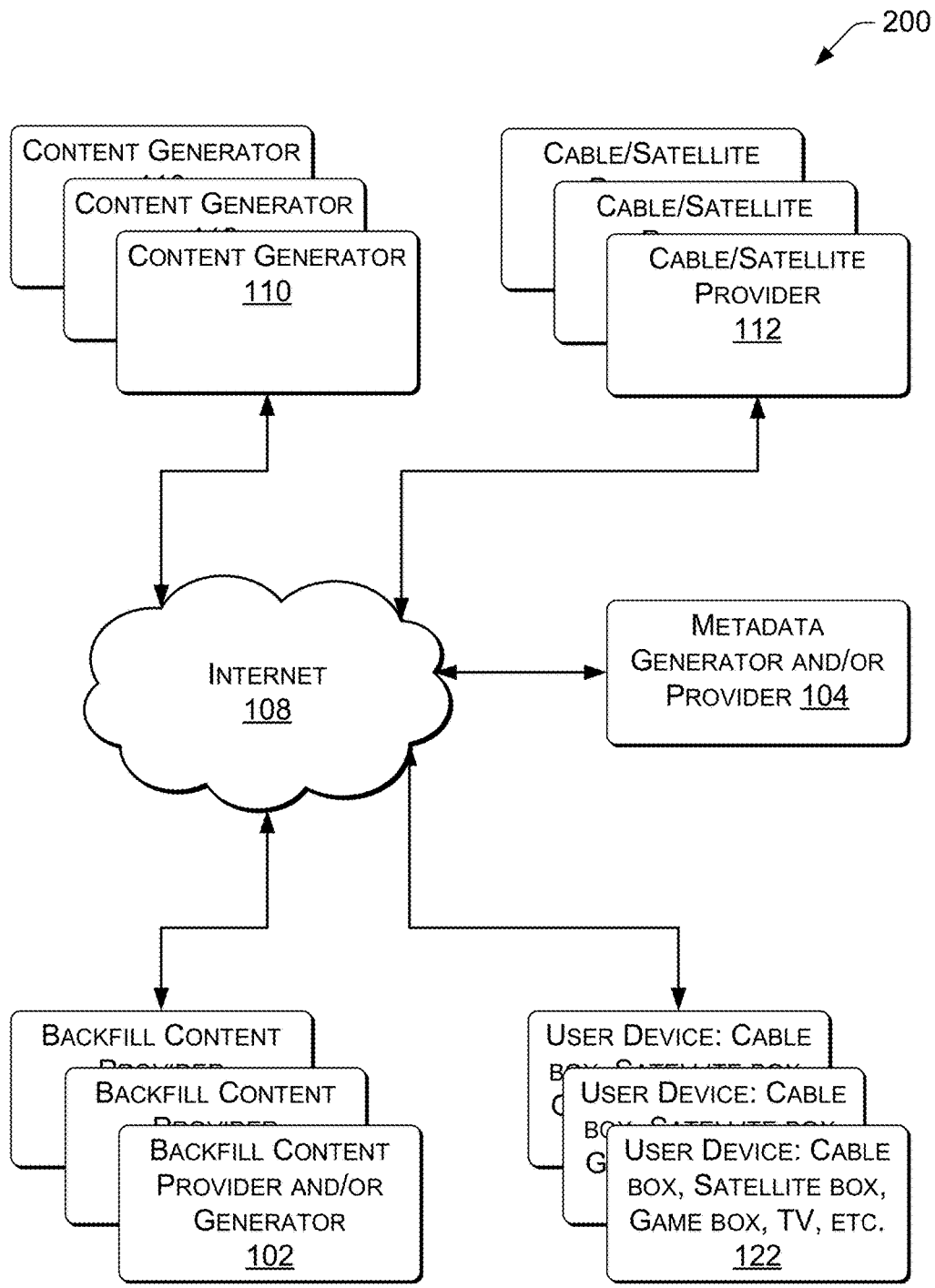
FIG. 2 is a diagram showing an example configuration of a metadata generator and/or provider, operable in a system including content generators, content providers, backfill content providers and/or end users.

FIG. 2 shows an example configuration of a metadata generator and/or provider 104, operable in a system 200 including content generators 110, service providers 112, backfill content providers 102 and end user devices 122. A number of content generators 110 may create a number of programs, which may include sporting events, awards shows, game shows, reality shows, dramas, movies, news programming, and others. The programming created by the content generators 110 may be distributed to a receiver box 122 of each of a plurality of end users by over the air broadcast, Internet-based multicast or single-cast, cable, and/or satellite providers 112. A metadata generator 104 creates metadata that is provided to one or more backfill content providers 102 and one or more user devices 122. The backfill content providers 102 may utilize the metadata to create BFC for each user, which may be sized and timed based at least in part on content (e.g., commercials) trimmed from that user's main content stream (MCS). The backfill content providers 102 may provide metadata to device(s) of end users to allow those devices to seamlessly switch between a MCS and BFC. Also, the metadata may allow device(s) of the user to segment programming available to device(s) of the user to create BFC.

Figure 3:
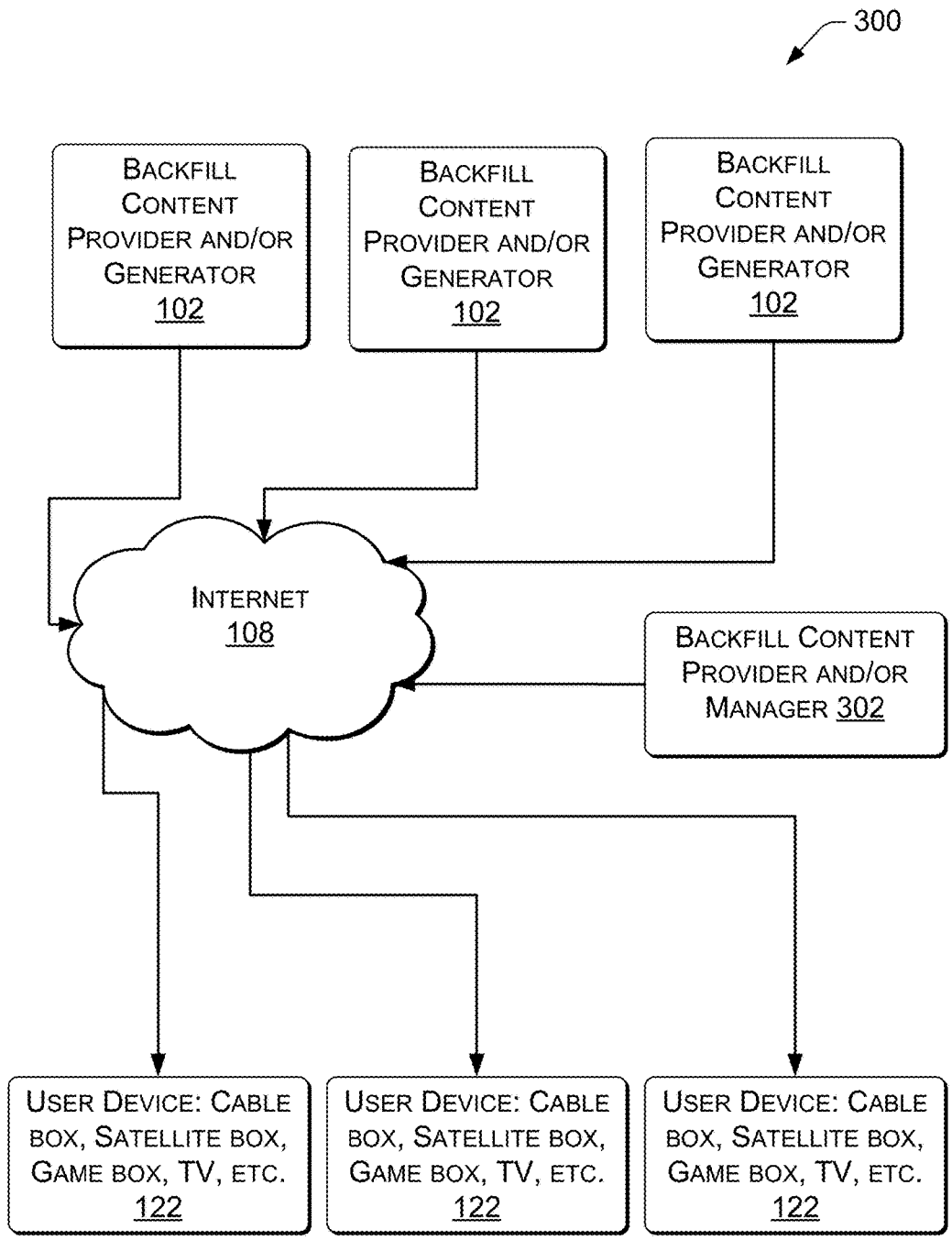
FIG. 3 is a diagram showing an example configuration of a backfill content provider and/or manager, operable in a system including backfill content providers and/or end users.

FIG. 3 shows an example configuration of a backfill content provider and/or manager, operable in a system 300 including backfill content providers and/or end users. A number of backfill content providers 102 may provide BFC to a number of devices 122 of a plurality of users over the Internet 108. A backfill content manager 302 may be configured to provide a "BFC store" so that users may select the BFC that they would like to view. An example user interface 400 (seen in FIG. 4) allows users to select BFC from among a plurality of BFC providers.

Example User Interfaces and Supporting Techniques

FIG. 4 shows an example user interface 400 configured to obtain information to allow a determination of what backfill content provider(s) a user would prefer to utilize and to illustrate underlying techniques of backfill content, metadata and other tools. The user interface (UI) may be provided by a BFC manager and/or provider (e.g., BFC provider 102 of FIG. 1 or BFC manager 302 of FIG. 3) and may be output for display by a computing device of the user (e.g., computer, tablet, box, TV, etc.). The UI 400 may be used to gather information from a user indicating the user's preferences for BFC. In one example, a user may select one or more options 402-436, to thereby indicate preferred BFC. Options 402-436 correspond to BFC providers or categories of BFC from which the user may elect to receive BFC. In another example, the user may move the options 402-436 up and down, to indicate relative priority. In some examples, selection of two or more options results in some BFC from each selected option. In some examples, a drop down tool may give the user additional choices. Selection of Apps 424 from the list allows the user to select from different applications that provide content to the user. The applications may be specially constructed to provide BFC. Thus, user interface 400 allows the user to select from among a plurality of BFC providers, such as Yahoo! 402, YouTube 404, Facebook 406, and others. For instance, if a user desires to receive fantasy sports information as BFC, the user may select one or more fantasy sports companies (fantasy sports platforms) from the list. In some examples, the user may have an account with one or more of the fantasy sports companies. Based on these selections, the user may receive clips, stats, scores (scores of the sporting event and/or fantasy scores), commentary, and other content.

Figure 5:
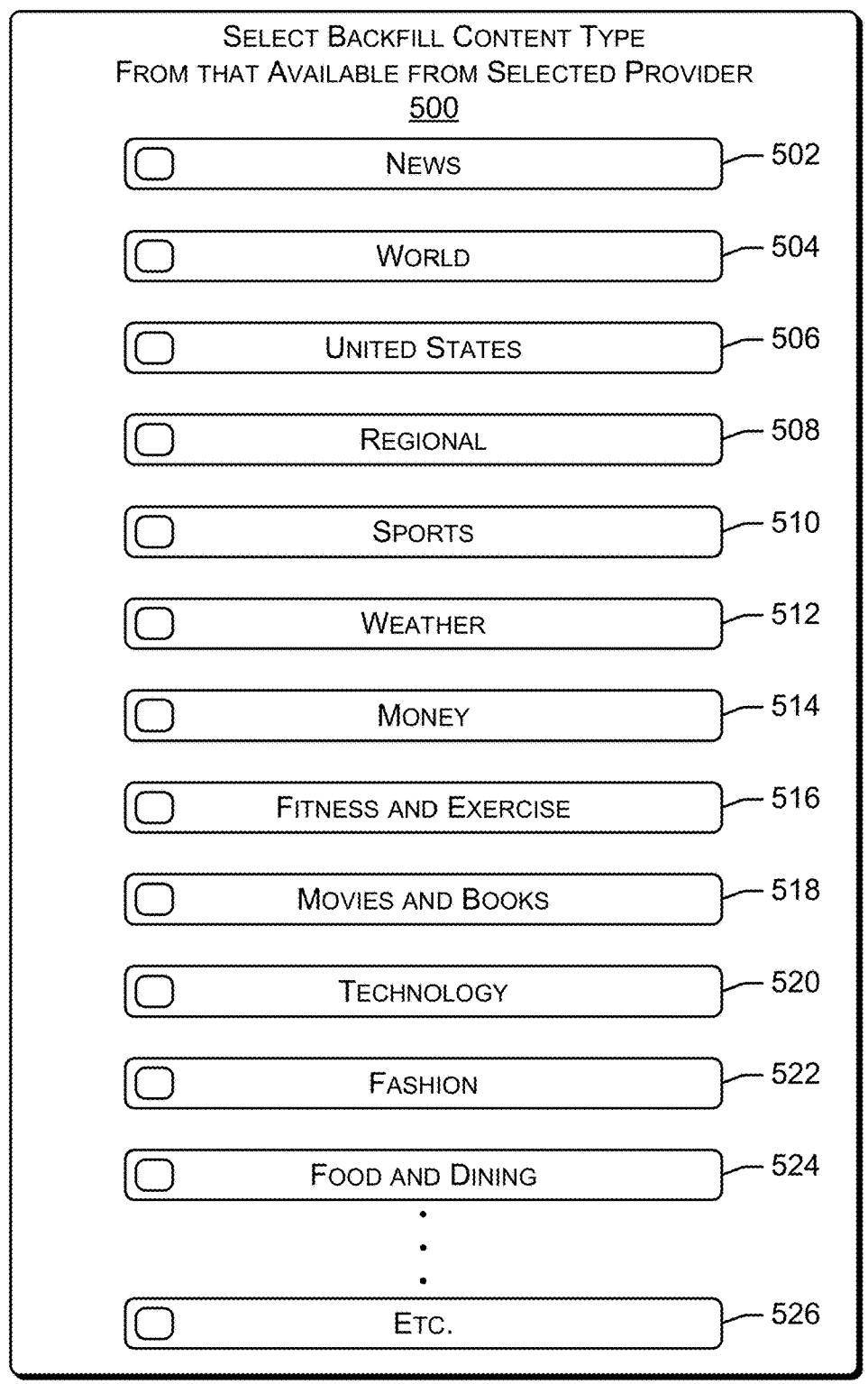
FIG. 5 is a diagram showing an example user interface configured to obtain information to allow a determination of what types of backfill content a user would prefer to watch from selected backfill content provider(s) and to illustrate underlying techniques of backfill content, metadata and other tools.

FIG. 5 shows an example user interface 500 configured to obtain information to allow a determination of what types of backfill content a user would prefer to watch from selected backfill content provider(s) and to illustrate underlying techniques of backfill content, metadata and other tools. If the user selected Yahoo! 402 from the user interface 400 of FIG. 4, the user may then select what type of BFC Yahoo! should provide by operation of user interface 500. In the example shown, News 502, the Weather 512 and others provide the user with many choices for the type of backfill content that is desired.

In addition to the explicit selections received via the user interfaces shown in FIGS. 4 and 5, additional selections may be inferred based on actions of the user or other users (e.g., the user's browser history). Additionally, in some examples, premium, featured, and/or sponsored BFC may also be provided to the user.

Figure 6:
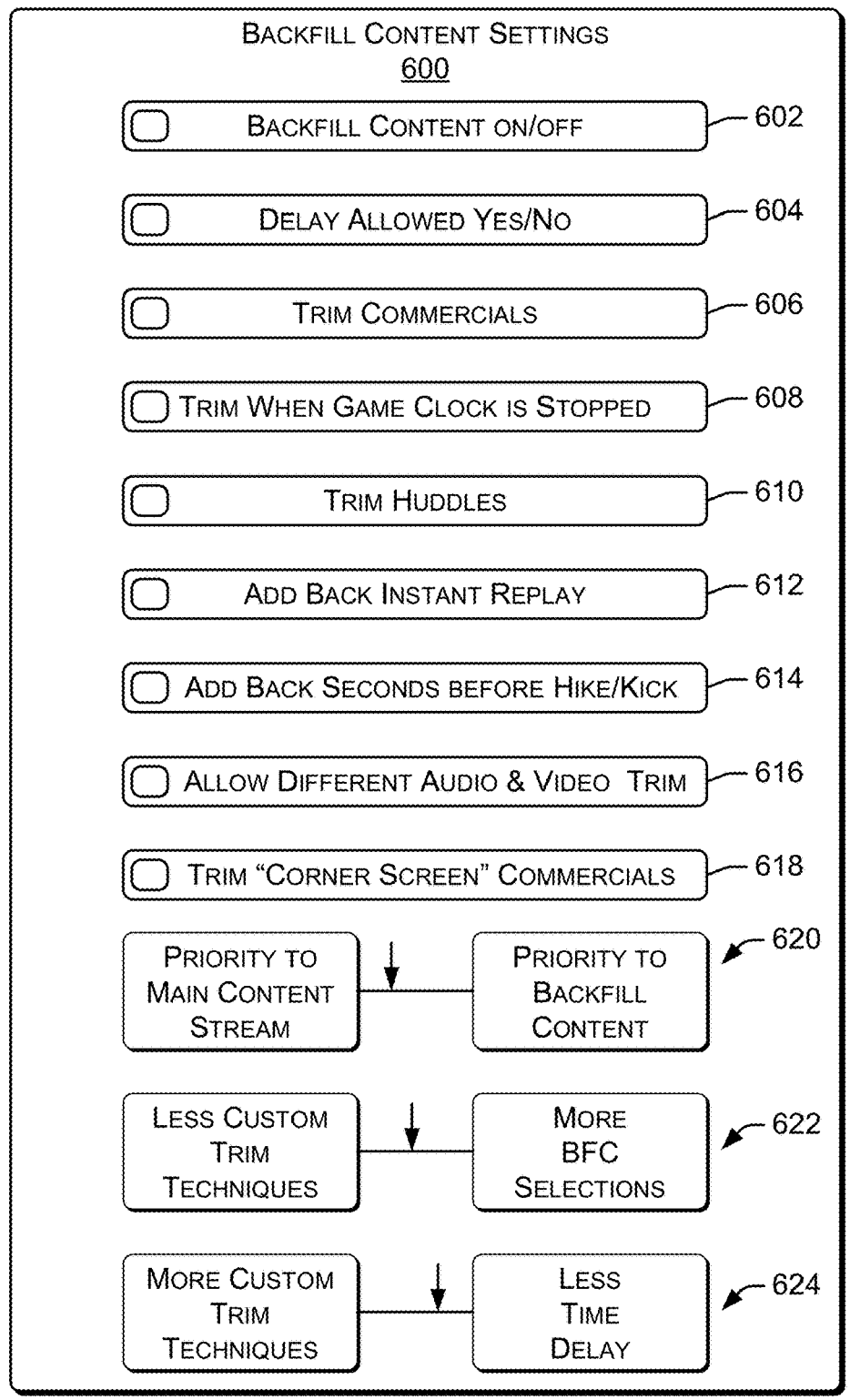
FIG. 6 is a diagram showing an example user interface configured to obtain information to allow a determination of a user's backfill content settings and to illustrate underlying techniques of backfill content, metadata and other tools.

FIG. 6 shows an example user interface 600 configured to obtain information to allow a determination of a user's preferred backfill content settings and to illustrate underlying techniques of backfill content, metadata and other tools. The settings are representative of settings that may be utilized in a particular system and installation and, in other examples, the particular settings may vary. At block 602, the use of backfill content may be turned on and off. If turned on, BFC may replace all commercials. If turned off, commercials within the user's main content stream will be shown. At block 604, the user indicates if a delay is allowed. For example, a short delay may result in display of the main content stream milliseconds or seconds later than it would otherwise be shown. This may be facilitated by operation of data buffers, which may be located on the user's cable, satellite or game box 122 or other locations. In some implementations, the data buffers may be maintained at a content generator 110 and/or service provider 112. The short delay provides the metadata provider (e.g., 104 in FIG. 1) time to determine the start of a commercial, which allows the user's device (or content generator or service provider) to switch to BFC at the start of the commercial. A short delay also allows BFC to "overrun" the end of the commercial that is part of the MCS. Thus, the BFC may continue to be displayed, perhaps for seconds following the return from commercials in the main content stream. The MCS is then buffered, while the BFC concludes. The user is returned to the MCS with a slight delay. When the MCS again goes to commercials, less BFC will be required, and the user will return to the MCS with less delay. Thus the short delay allowed by block 604 may prevent the first second or so of the commercial from appearing, and may prevent from the first second of the programming after a commercial set from being lost. At block 606, the user may elect to trim commercials. In one example, trimming the commercials creates "holes" in the MCS that can be filled by BFC. At block 608, the user may elect to trim content when the game clock is stopped, such as in a football game. By trimming out such content ("trim content"), substantial BFC may be watched, which may constitute most of a different game. At block 610, the user may want to trim out football huddles, which allows display of more BFC, which could be a different football game. Similarly, in other sports, the user may choose to trim out other periods of inactivity, periods of non-game-play, periods of discussion (e.g., by or between players, coaches, officials, analysts, etc.), and the like. At block 612, the user may want "add back" certain content that would have otherwise been trimmed, such as instant replays, thereby preventing such replays from being trimmed (as they would, if trimming was allowed while the clock was stopped). At block 614, a small segment of content preceding the trimmed content (e.g., the seconds before and after a hike or kick of the football) may be added back (if they were trimmed at block 608). At block 616, audio and video may be time-shifted with respect to each other. If only commercials are trimmed, this is not an issue. However, if substantial other content is removed (e.g., so the user can watch a different game, presented as BFC) then it may be helpful to allow different audio and video trim. Selection of block 616 allows the audio discussion of a past play to be moved back to the video that is being discussed.

At block 618, "corner screen" or "edge of screen" commercials be used by networks, such as to advertise an upcoming or concurrently occurring television show. Selection of 618 allows BFC to be superimposed on such corner or edge of screen commercials or advertisements. At block 620, the user may move a slider or otherwise indicate a relative preference between giving priority to the main content stream or to backfill content. In an example, a user may willing to give BFC a higher priority, thereby signaling the user's device and/or the BFC providers to trim more extensively from the MCS and to provide appropriately more BFC. At block 622, the user may select a balance between more MCS (i.e., less trimming of the MCS), or alternatively, more BFC (i.e., more trimming of the MCS). At block 624, the user may select a balance between more trimming of the MCS, and alternatively, less time delay. In order to trim the MCS extensively, it may be desirable to present the MCS with some delay. The delay allows for significant content to be trimmed without excessive alternation between the MCS and the BFC. While the UI 600 presents a number of options, numerous additional or alternative events may be used to turn BFC on at block 602, allow a delay at block 604 and trim commercials at block 606.

Figure 7:
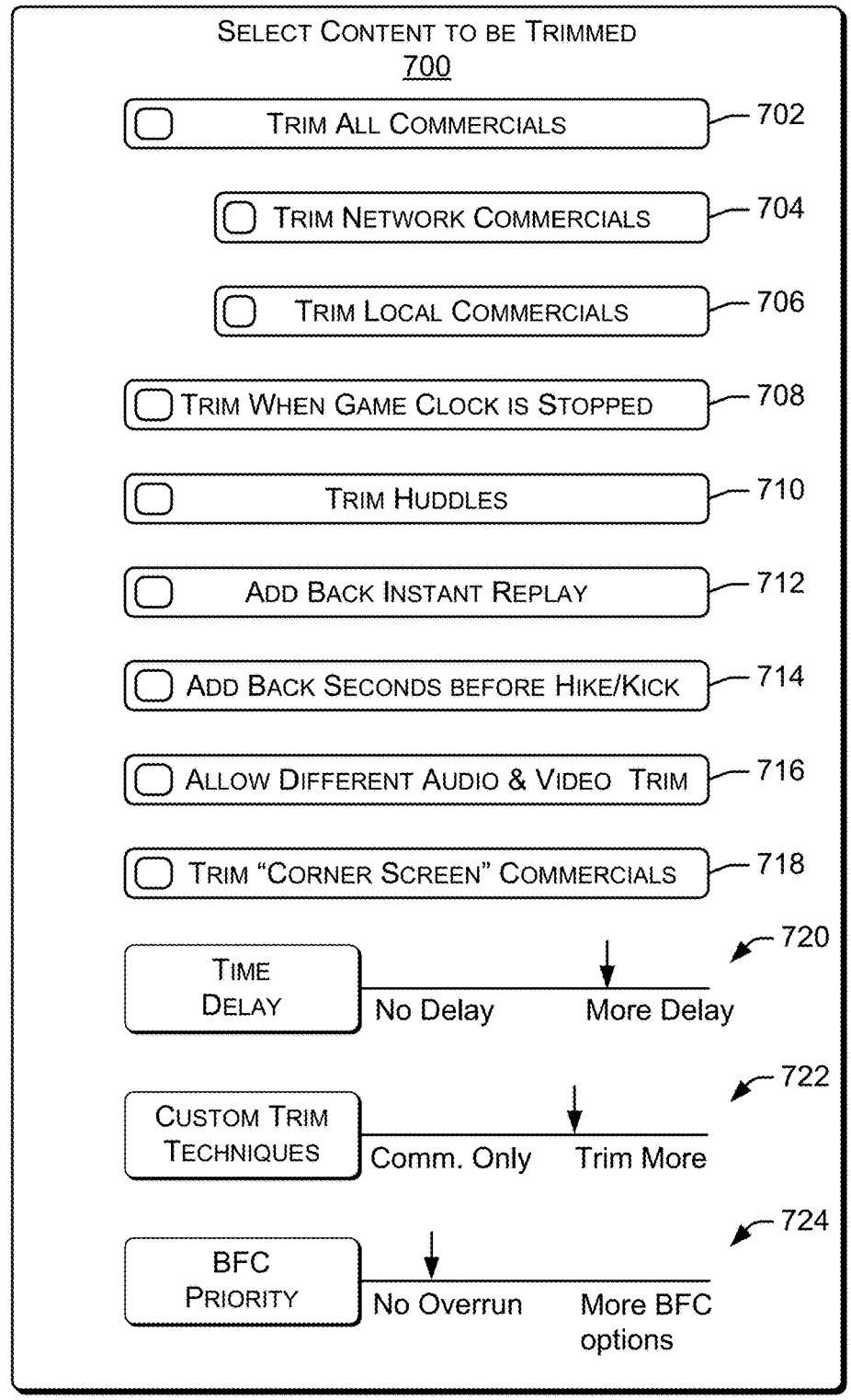
FIG. 7 is a diagram showing an example user interface configured to obtain information to allow a determination of what content the user would like to "trim" from a main content stream, to allow time for display of backfill content and to illustrate underlying techniques of backfill content, metadata and other tools.

FIG. 7 shows a further example user interface 700 configured to obtain information to allow a determination of what content the user would like to "trim" from a main content stream, to allow time for display of backfill content and to illustrate underlying techniques of backfill content, metadata and other tools. At block 702, the user may elect to trim all commercials, or at blocks 704 and 706, only network or local commercials, respectively. At blocks 708 and 710, content may be trimmed when the game clock is stopped or teams are in huddles, respectively. Blocks 708-718 are similar to corresponding blocks in the UI 600 of FIG. 6. At block 720, the user may control the amount of time delay of the MCS. In some instances, allowing a few more seconds of delay, in the presentation of the MCS, will allow for cleaner removal of the commercials. At block 722, the user may control the use of custom trim techniques in a generalized manner. By trimming more, the user will receive more BFC, which is useful when watching a second game using BFC. At block 724, the user may control the priority given to BFC, including whether a BFC segment is allowed to overrun the end of commercials included in the MCS. Such an overrun would cause the MCS to be presented in a time-delayed manner. The time delay could be reduced by sending less BFC to fill-in for the next commercial set.

Figure 8:
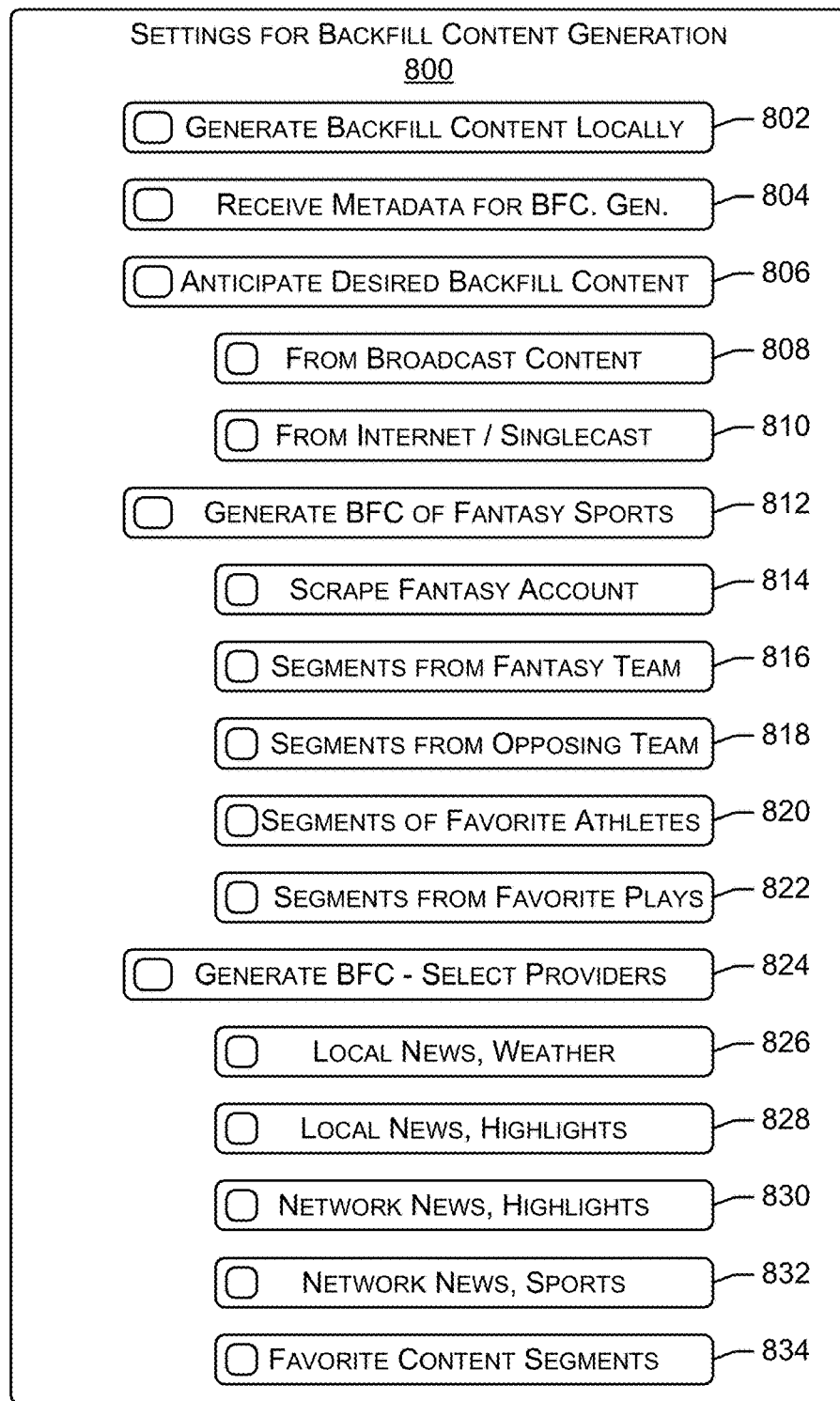
FIG. 8 is a diagram showing an example user interface configured to obtain information to allow a determination of how a user would like to generate backfill content locally, such as using signals incoming to the user's residence and to illustrate underlying techniques of backfill content, metadata and other tools.

FIG. 8 shows an example user interface 800 configured to obtain information to allow a determination of how a user would like to generate backfill content locally, such as using signals incoming to the user's residence and to illustrate underlying techniques of backfill content, metadata and other tools. Alternatively, the user may direct an external website (e.g., fantasy sports platform) to generate the fantasy sports related BFC. At block 802, the user may elect to have backfill content generated locally, i.e., on the user's satellite box, cable box, game console, etc. In an example, a game that the user is not watching may be segmented into highlights for use as BFC. At block 804, the user may elect to receive metadata for BFC generation. The metadata will instruct a device of the user as to how to segment a second content stream (e.g., a football game on a different TV channel from the MCS) into sizes appropriate for use as BFC. At block 806, the user may elect to allow the game console/cable box to anticipate the need for BFC, and to automatically create BFC in response. In some examples, at least some BFC may be generated and stored in advance the start of the main content stream. Additionally or alternatively, BFC may be generated concurrently while the user is viewing MCS. At block 808 and 810, the user may elect to allow the user's device to use broadcast (e.g., air, cable or satellite) or Internet-based content to create the BFC. At block 812, the user may elect to generate BFC related to fantasy sports. Alternatively or additionally, the user may elect to download BFC from a fantasy sports Internet-based platform. At block 814, the user may elect to have the user's fantasy sports account scraped to obtain the information about the user's fantasy sports team(s). Thus, the user's fantasy team roster (athletes on the user's fantasy team) may be discovered, along with the rosters of other teams in the user's fantasy league(s). The UI 800 may allow the user to annotate this information (or provide additional or alternative information) to indicate the user's favorite athletes, favorite teams and/or the user's favorite plays (e.g., touchdowns, sacks, home runs, strike outs, goals, baskets, lead changes, passes, knockouts, knockdowns, etc.). The UI 800 presented may be geared toward a specific sport or content type, in which case the blocks, controls, and UI elements may be specific to the sport or content type (e.g., football in the case of FIG. 8). In other examples, the UI 800 may be generic or agnostic to the content type, in which case the blocks, controls, and UI elements may be applicable regardless of the sport or content type. Blocks 816-822 are representative of elections the user may make to receive video segments regarding the user's fantasy team, an opposing fantasy team, the user's fantasy league, the user's favorite athletes, the user's favorite NFL or other league teams, and/or the user's favorite plays. Thus, for example, segments may be generated that depict athletes' performances that were awarded fantasy points. Accordingly, the user may "watch fantasy football" or other sport as the BFC. At block 824-834, the user may elect to locally generate BFC segments based on local news and weather, local news highlights, network news highlights, network news sports, and other favorites of the user. Thus, any content stream (e.g., TV channel) that is available at the user's device (cable box, game box, etc.) may be segmented according to metadata from metadata 104 to generate BFC for use with a main content stream. As discussed elsewhere, other sources of BFC may also be used, such as social media sources (e.g., Facebook, Twitter, etc.), digital videos (e.g., from YouTube, Netflix, other internet sources, locally stored video, etc.), or the like.

Figure 9:
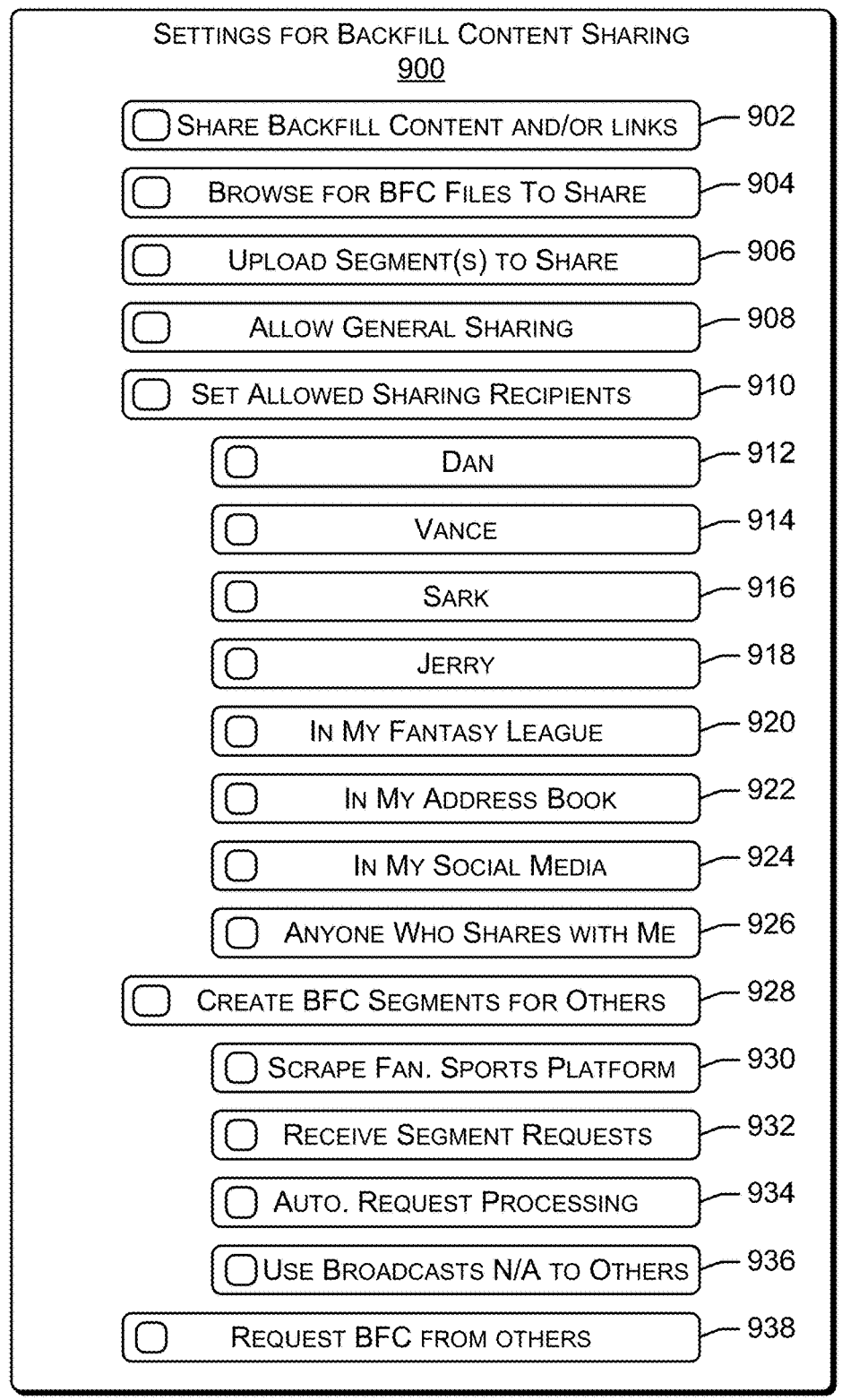
FIG. 9 is a diagram showing an example user interface configured to obtain information to allow a determination of how a user would like to share backfill content with other user(s) and to illustrate underlying techniques of backfill content, metadata and other tools.

FIG. 9 shows an example user interface 900 configured to obtain information to allow a determination of how a user would like to share backfill content with other user(s) and to illustrate underlying techniques of backfill content, metadata and other tools. At block 902, the user may elect to share BFC segments with other users. The user may have created a BFC segment regarding local weather or an athlete's performance that resulted in the award of fantasy sports points. Such a segment may have been generated using metadata from a metadata provider. At block 904, the user may elect to browse or search through a file system or other repository for BFC segments to share with others. At block 906, the user may select to upload an A/V clip, which could be used as BFC by the user or other users. At block 908, the user may elect to allow any other user to share some or all BFC stored on the user's device. In that case, the BFC stored on the user's device may be published to a BFC marketplace and made available for others to view and download. Thus, individual users may be BFC providers. At block 910, the user may allow certain people to share the user's content. At blocks 912-918, the user may elect to give individual permissions to friends. At blocks 920-926, the user may elect to share BFC clips with others in the user's fantasy league, in the user's address book, known to the user through social media, or even to anyone who shares with the user. Different users may have different BFC available to them, due to their subscription to different channel packages, different metropolitan areas, etc. At block 928, the user may elect to create BFC segments for others. The user may not be particularly interested in these BFC segments, but the user's device(s) may have the ability to generate them (e.g., due to the channels available to the user) for other users who do not have the ability. At block 930, the user may elect to scrape the user's fantasy sports platform, to obtain fantasy sports information (team rosters, etc.) of the user and/or the user's friends. Such information may be used, with metadata from a provider 104, to create BFC segments of interest to the other user(s), such as by segmenting content from one or more of the user's TV channels. At block 932, the user may elect to field requests from friends for content and/or ready-made BFC segments. At block 934, the user may elect to have the user's device process such requests automatically. Additionally or alternatively, the user may request BFC from friends, such as BFC that is related to the user's fantasy team, fantasy opponent, fantasy league, real-life favorite athletes, teams, plays, etc. At block 936, the user may elect to use broadcasts, available to the user, but which may not be available to other users, to create fantasy sports, sports or other BFC, such as by using metadata from a provider 104. At block 938, the user may request, receive and use BFC from other users. Such users may have access to content not available to the user, which may be segmented into BFC using metadata from a provider 104. In some examples, the user's BFC and BFC from multiple other users and BFC providers may be uploaded to a marketplace or clearinghouse from which users can select and obtain BFC. Users may subscribe to BFC of certain types or from certain users or BFC providers. In some examples, BFC providers may charge a fee for BFC. In some examples, the BFC may be shared amongst users using a distributed or peer-to-peer file sharing system such as BitTorrent.

Figure 10:
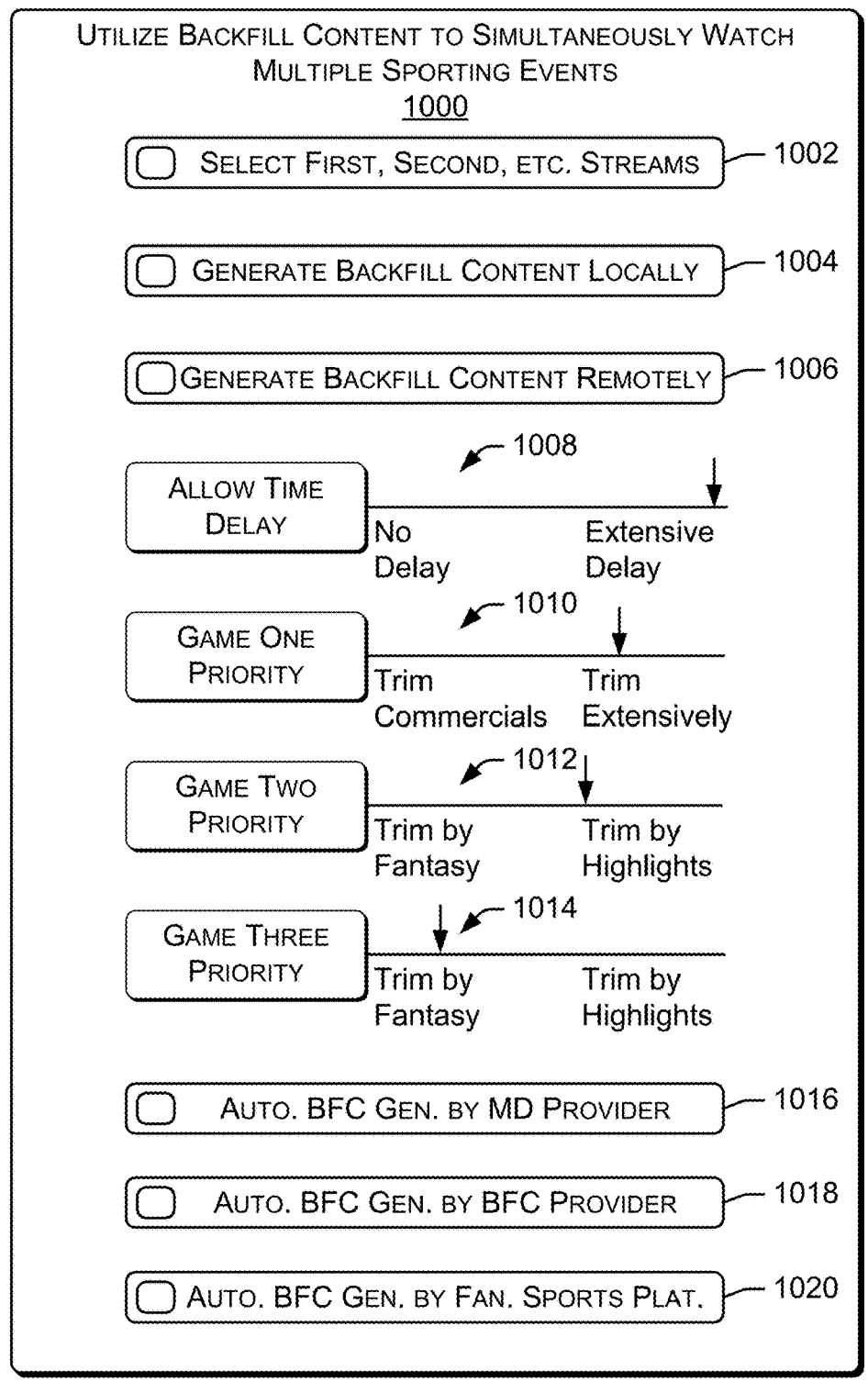
FIG. 10 is a diagram showing an example user interface configured to obtain information to allow a determination of how a user would like to utilize backfill content techniques to remove content from one content stream (e.g. a preferred football game), to supplement that content stream with highlights from other content stream(s) (e.g., other football games) and to illustrate underlying techniques of backfill content, metadata and other tools.

FIG. 10 shows an example user interface 1000 configured to obtain information to allow a determination of how a user would like to utilize backfill content techniques to remove unwanted content from one content stream (e.g. a preferred football game), to supplement that content stream with highlights from other content stream(s) (e.g., other football games) and to illustrate underlying techniques of backfill content, metadata and other tools. At blocks 1002, 1004, 1006 the user may identify two or more content streams or events that the user would like to watch. At block 1008, the user may elect to allow a delay in the primary content stream. The delay may assist in the presentation of the secondary games as BFC and may reduce the number of times presentation of BFC and the MCS switch. However, the user may decline the delay, or accept only a limited delay (e.g., no more than a few seconds). At block 1010, the user may elect to trim the primary game to allow time to see highlights from the other game(s). The user may also set an extent to which the primary game should be trimmed. The setting of the extent of trimming may be made by setting the types or portions of the content that should be trimmed (e.g., commercials, timeouts, etc.), a time of the primary content that should be trimmed (e.g., 5 minutes, 10 minutes, etc.), and/or a percentage of the primary content that should be trimmed. At blocks 1012 and 1014, the user may elect to trim one or more secondary games to result in fantasy sports related highlights or general highlights to be used as BFC. In some examples, the fantasy highlights may be more consequential to the user's fantasy team (e.g., they may involve athletes that are on a roster of the user or an opponent in a fantasy league of the user), while the general highlights may be more impressive and/or consequential to the game overall (e.g., only touchdowns, lead changes, etc.). At block 1016, the user may elect to allow automatic BFC generation based on content (e.g., TV channels) received by the user and using metadata received from a provider 104. At blocks 1018 and 1020, the user may elect to receive BFC by a BFC automatically generated and sent by a BFC provider 102 or a fantasy sports platform, respectively. The BFC may be customized for the user, such as by using information obtained from a fantasy sports account of the user.

FIG. 11 shows an example user interface 1100 to allow a user to select and prioritize BFC for later use and to illustrate underlying techniques of backfill content, metadata and other tools. In the example, the user's BFC buffer has a number of BFC segments ready for presentation when the MCS enters a commercial. The user may view the UI 1100 on a tablet, phone, PC, or other device, and may prioritize them by moving individual elements 1102-1130 up or down within the listing. Accordingly, when the MCS goes into a commercial, the user's computing device may cause presentation of the BFC segments in the order indicated by the arrangement of the user. The BFC segments may be almost any content desired by the user, and may be obtained by subscribing to BFC generators or authors. In some examples, the BFC generators may be commercial BFC providers, or other users that have generated and shared their BFC.

FIG. 12 shows an example user interface 1200 to allow one user to access a listing of BFC available to from friend(s) or other users, to pull content data files and/or links to content from the friends' device(s) to the user's device(s) and to illustrate underlying techniques of backfill content, metadata and other tools. Accordingly, by selecting one or more of the BFC items 1202-1230 on a different user's BFC queue, the user may have data files and/or links to the data files transferred to the user's BFC queue. Accordingly, users are able to share BFC with friends and other users.

Example Methods of Operation

Figure 13:
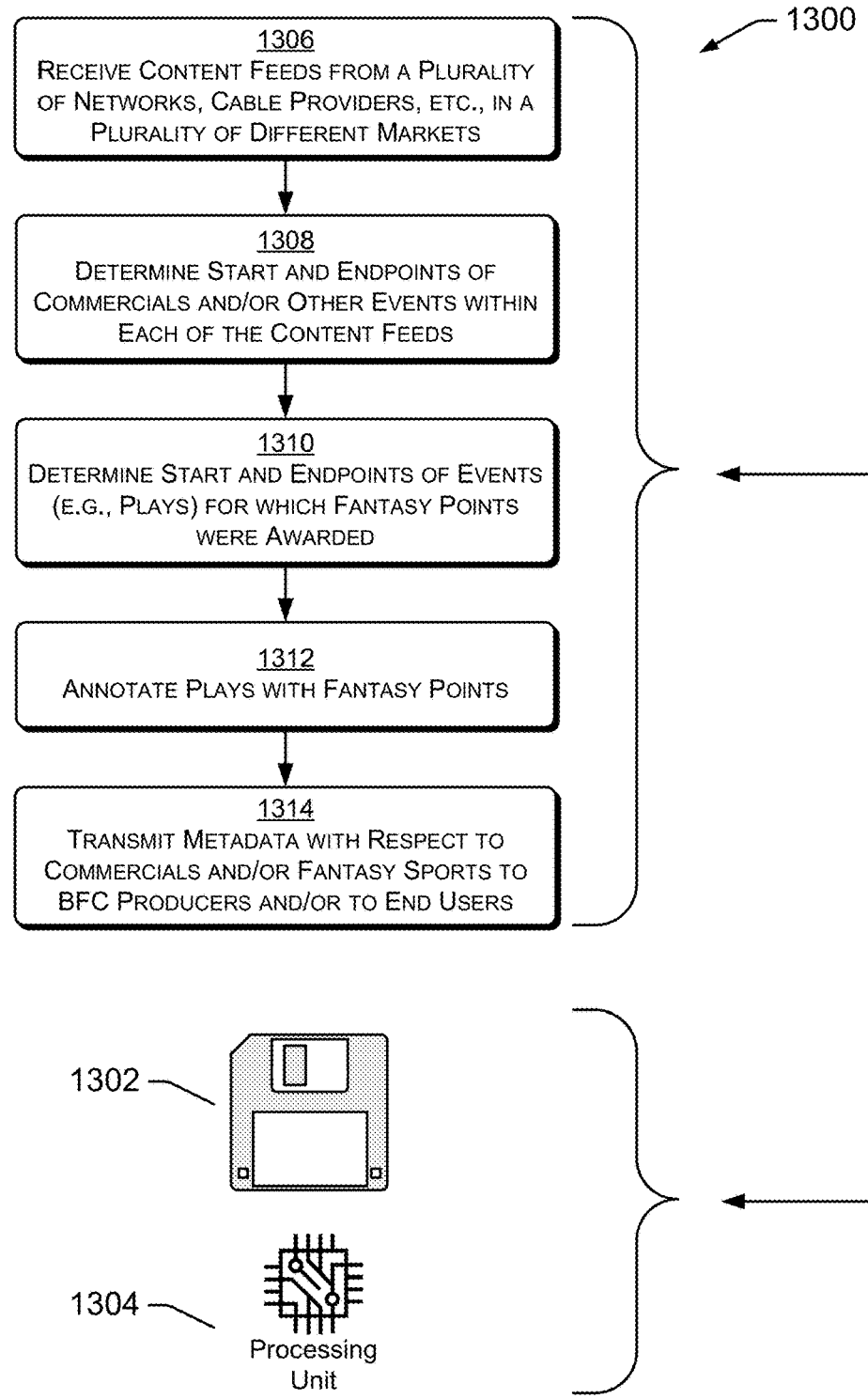
FIG. 13 is a flow diagram showing an example method by which metadata, useful to assist in the delivery of backfill content to users (e.g., by determining when commercials and/or other undesirable content are broadcast in a main content stream watched by the user), may be generated and/or utilized.

FIG. 13 shows an example method 1300 by which metadata, useful to assist in the generation of backfill content for transmission to users, and/or useful in the generation of backfill content on a device of a user, may be generated and/or utilized. The metadata may indicate when commercials and/or other undesirable content are broadcast in a main content stream watched by the user. The metadata may indicate the start and stop times of "plays" (or other events) for which fantasy sports points were awarded.

A memory device 1302 and may be in communication with a processing unit 1304, and may be located in a metadata provider or generator (e.g., metadata provider 104 of FIG. 1). The processor 1304, together with instructions defined in the memory unit 1302 and potentially other hardware and software components, may perform the method 1300.

At block 1306, a plurality of content feeds are received, such as at a metadata provider. The transmissions may include programming of football games or other sporting events, game shows, dramas, movies, news shows, etc. The content feeds may be provided by a plurality of networks (e.g., NBC, CBS, FOX, etc.) and may be associated with a plurality of cable and/or satellite providers (e.g., Comcast, Dish Network, etc.), and may be associated with a plurality of different markets (e.g., New York, Dallas, Los Angeles, etc.) and may be in different time zones. The content feeds may comprise scheduled programming (i.e., content that is "aired" at a scheduled time) and/or unscheduled programming (i.e., programming that is prerecorded and available for viewing at a user's leisure—On-Demand programming is an example of unscheduled programming).

At block 1308, metadata, such as the start and endpoints of commercials and/or other events within each of the content feeds, are determined, e.g., in substantially real time. As discussed above, in examples related to sports programming, the "other events" may include periods of inactivity, such as time when a clock is not moving in a sporting event.

At block 1310, in some examples, the metadata generation may be related to fantasy sports, such as fantasy football, fantasy baseball, fantasy soccer, fantasy racing, etc. In such examples, the metadata may include the start and stop times of plays, thereby forming A/V clips. At block 1312, the clips may be annotated with fantasy sports information, such as an identification of athletes whose efforts were awarded fantasy points, the number of points and/or a description of the events for which the points were awarded. Additional details of example techniques for segmenting content to generate claims and appending the clips with fantasy sports information can be found in U.S. patent application Ser. No. 14/285,607, filed on May 22, 2014, which is incorporated herein by reference.

At block 1314, the metadata may be transmitted to BFC producers and/or to end users. The BFC producers may use the metadata to create BFC of playback duration appropriate for use in the replacement of commercials and/or other content removed from the main content stream (MCS). The end users may use the metadata to shift between the MCS and BFC, and to thereby avoid commercial content in the main content stream. The end users may also use the metadata to segment secondary content streams (e.g., football games or other sporting events that they are not fully watching) into BFC for playback in place of commercials in the MCS.

Figure 14:
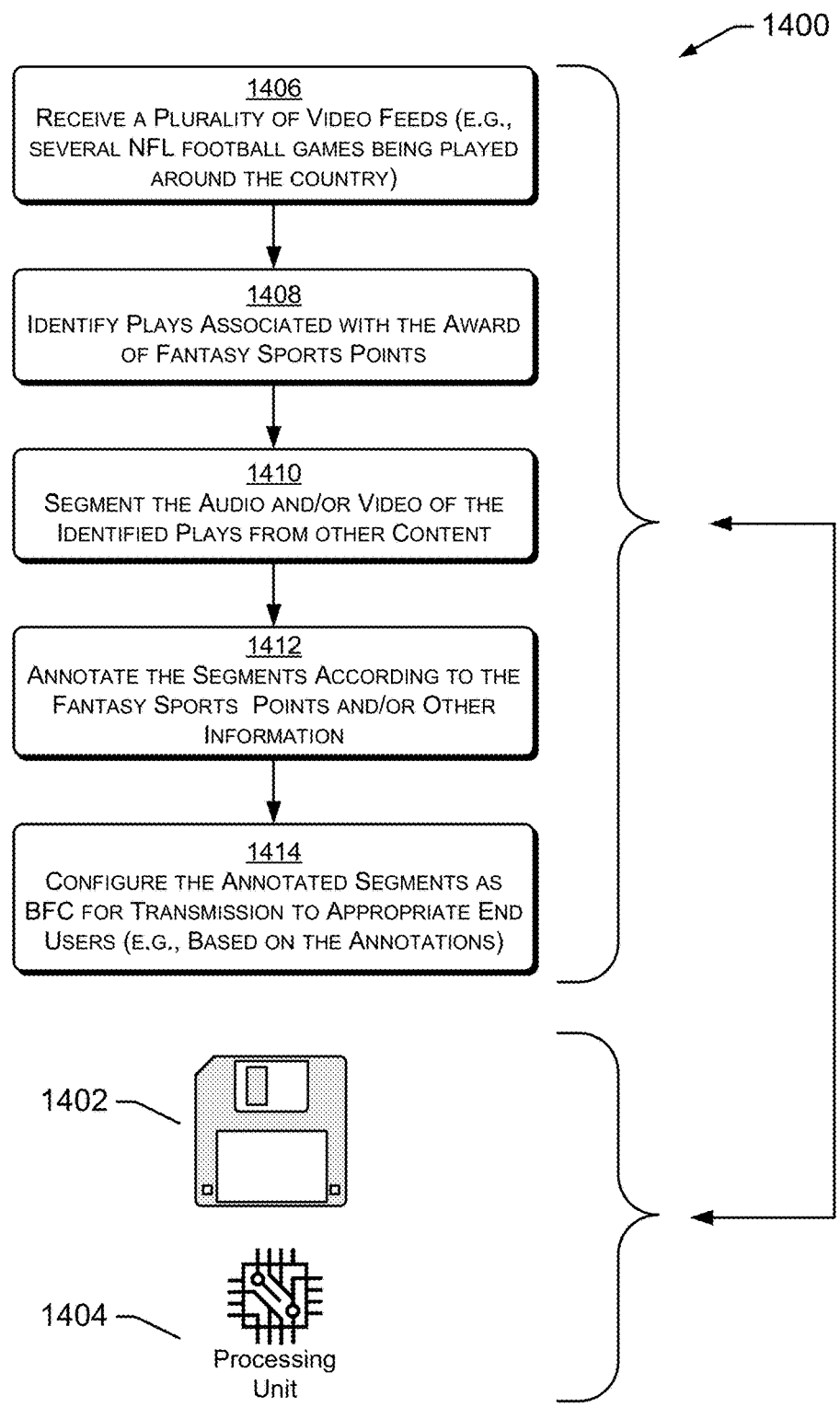
FIG. 14 is a flow diagram showing an example method by which backfill content, useful to supplement a main content stream of a user after commercials and other undesired content have been removed, may be generated and/or provided to users.

FIG. 14 shows an example method 1400 by which backfill content, useful to supplement a MCS of a user after commercials and other undesired content have been removed, may be generated and/or provided to users. While methods 1300 and 1400 are shown separately, the techniques could be combined, in whole or in part, and performed by a single engine (e.g., engine 106 of FIG. 1). In one example, a plurality of video feeds would be received (e.g., several NFL football games concurrently being played around the country), plays associated with the award of fantasy sports points would be identified, the audio and/or video of the identified plays segmented from other content, the segments annotated according to the fantasy sports information, and the annotated segments configured as BFC for transmission to appropriate end users (possibly based on the annotations).

A memory device 1402 and may be in communication with a processing unit 1404, and may be located in a backfill content provider or generator (e.g., BFC provider 102 of FIG. 1). The processor 1404, together with instructions defined in the memory unit 1402, may perform the method 1400.

At block 1406, a plurality of video feeds may be received, such as by a BFC provider. The plurality of video feeds may include several NFL football games (or other sporting events) being played around the country. At block 1408, plays associated with the award of fantasy sports points may be identified. At block 1410, the audio and/or video of the identified plays may be segmented from other content (e.g., from other video). At block 1412, the segments may be annotated according to the fantasy sports points and/or other information. At block 1414, the annotated segments may be configured as BFC for transmission to appropriate end users. In one example, the end users to whom the BFC is transmitted are users that have interests in the athletes in the BFC, either because the athletes are on the user's fantasy team, on the user's opponent's fantasy team, on a roster of another team in a fantasy league in which the user participates, on the user's favorite real life team and/or are athletes of interest to the user.

FIG. 15 shows an example method 1500 by which metadata, is used to segment a content stream available to a user (e.g., a television channel the user is not primarily watching) into backfill content. In an example, main and secondary content streams watched by a user are determined. Metadata are generated for use in trimming content from the main content stream (i.e., to identify commercials or other trim content so that a user's computing device can recognize the commercials or trim content). Metadata are generated to indicate game highlights or fantasy sports highlights of a game on the secondary content stream. The game highlights and/or the fantasy sports highlights may be segmented and configured as backfill content to replace commercials in the main content stream. The BFC may then be sent to users (directly or via an intermediary marketplace or other service). In some examples, the BFC may be sent via a distributed or peer-to-peer file sharing service such as a torrent. Alternatively, the BFC may be generated locally by the users' devices using appropriate metadata.

A memory device 1502 may be in communication with a processing unit 1504, and may be located in a clip generating engine (e.g., engine 106 of FIG. 1) or box 122. The processor 1504, together with instructions defined in the memory unit 1502, may perform the method 1500 alone or in combination with one or more other processors and/or computing devices. At block 1506, a main and at least one secondary content stream watched by a user are determined. At block 1508, metadata for use in trimming content from the main content stream is generated and/or received. At block 1510, metadata to indicate game highlights and/or fantasy sports highlights or point-awarded plays is generated and/or received. The metadata of blocks 1506 and 1508 may be generated at a metadata provider 104 and received by a device (e.g., box 122) of the end user. At block 1512, the game highlights and/or the fantasy sports highlights may be segmented from the secondary content stream. Alternatively, in some examples, the secondary content stream may be received already segmented. At block 1514, the segmented highlights may be configured as backfill content to replace commercials in the main content stream. At block 1516, the backfill content may be used at, or sent to, the end user's device. The end user's device uses the metadata to recognize trim content in the MCS uses the backfill content to replace commercials or other trim content in the main content stream.

Figure 16:
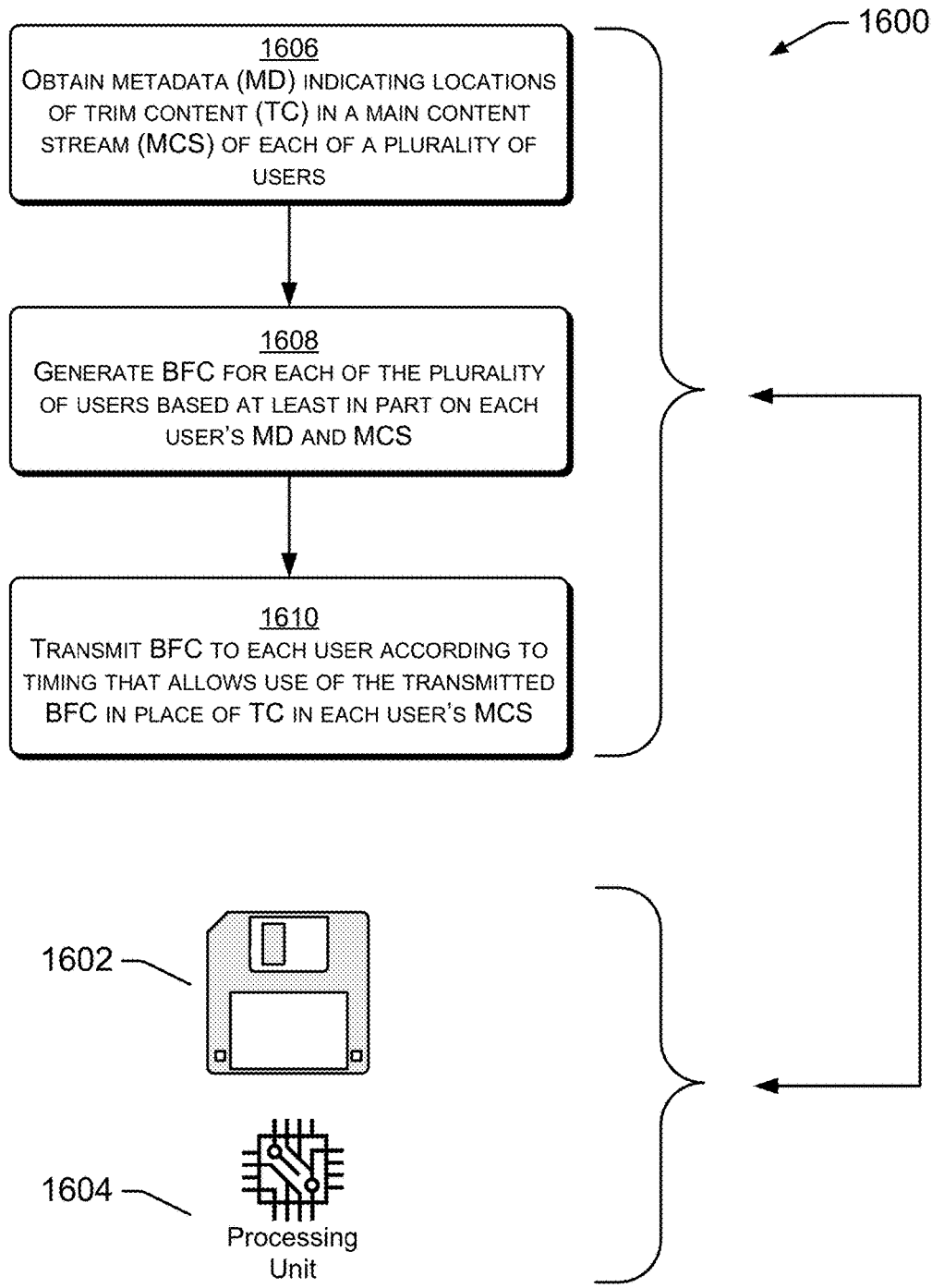
FIG. 16 is a flow diagram showing an example method by which metadata and backfill content may be created, transmitted and/or utilized.

FIG. 16 shows an example method 1600 by which metadata and backfill content may be created, transmitted and/or utilized. A memory device 1602 may be in communication with a processing unit 1604, and may be located in a clip generating engine (e.g., engine 106 of FIG. 1). The processor 1604, together with instructions defined in the memory unit 1602, may perform the method 1600. At block 1606, metadata is obtained or generated indicating locations of trim content (content to be trimmed or removed) in a respective main content stream of each of a plurality of users. By way of example and not limitation, trim content may include commercials or ads in the main content stream, periods when a game clock of a sporting event depicted in the main content stream is not moving (e.g., huddles, time outs, official reviews, half time, between periods, pre-game, etc.), periods when a sporting event depicted in the main content stream is not being depicted (e.g., analyst commentary, cheer leaders, pit crew, athlete interviews, etc.), other content identified as being undesirable to the user (e.g., based on explicit or implicit user preferences), or periods in the main content stream when content of interest to the user is absent from (i.e., not depicted in) the main content stream (e.g., periods when persons of interest, such as athletes on a fantasy sports roster of the user, are not depicted in the main content stream).

At block 1608, backfill content is generated for each of the plurality of users based at least in part on each user's metadata and main content stream. At block 1610, backfill content is transmitted to each user according to timing that allows use of the transmitted backfill content in place of trim content (e.g., commercials) in each user's main content stream. Thus, each user views a custom content stream comprised of a main content stream interspersed one or more backfill content segments selected by or chosen for the respective user. Two users watching the same main content stream may receive different backfill content based on the selections and preferences of the different users.

FIG. 17 shows an example method 1700 by which metadata and backfill content may be created, transmitted and/or utilized. A memory device 1702 may be in communication with a processing unit 1704, and may be located in a clip generating engine (e.g., engine 106 of FIG. 1). The processor 1704, together with instructions defined in the memory unit 1702, may perform the method 1700 alone or in combination with one or more other processors and/or computing devices. At block 1706, an indication of a main content stream (MCS) used by each of the plurality of users is received. At block 1708, metadata (MD) is sent to each of the plurality of users. The MD may indicate locations of trim content (TC) in the MCS of each of the plurality of users. At block 1710, BFC may be generated for each of the plurality of users based at least in part on each user's MD and MCS. At block 1712, the BFC generated for each user may be transmitted to each user. In some examples, the BFC for each user may also be uploaded to a BFC repository or marketplace, or otherwise made available for sharing with other users. The transmission may be made according to timing that allows use of the transmitted BFC in place of TC in each user's MCS.

Figure 18:
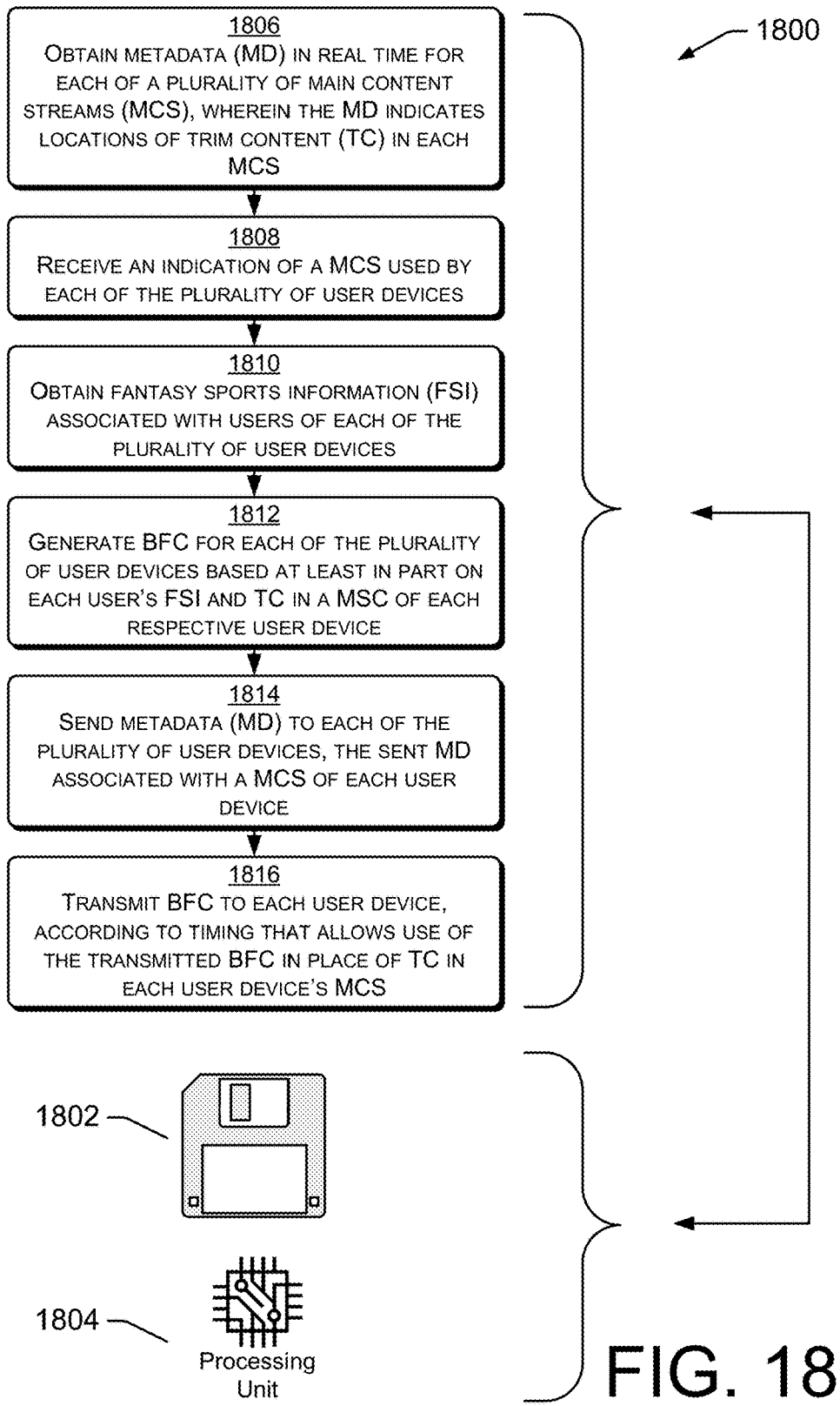
FIG. 18 is a flow diagram showing yet another example method by which metadata and backfill content may be created, transmitted and/or utilized.

FIG. 18 shows an example method 1800 by which metadata and backfill content may be created, transmitted and/or utilized. A memory device 1802 may be in communication with a processing unit 1804, and may be located in a clip generating engine (e.g., engine 106 of FIG. 1). The processor 1804, together with instructions defined in the memory unit 1802, may perform the method 1800 alone or in combination with one or more other processors and/or computing devices. At block 1806, metadata (MD) may be obtained in substantially real time for each of a plurality of main content streams (MCS). In one example, the MD indicates locations of trim content (TC) in each MCS. At block 1808, an indication of a MCS used by each of the plurality of user devices is received. At block 1810, fantasy sports information (FSI) associated with users of each of the plurality of user devices is obtained. At block 1812, BFC is generated for each of the plurality of user devices based at least in part on each user's FSI and TC in a MSC of each respective user device. At block 1814, metadata (MD) is sent to each of the plurality of user devices. In an example, the sent MD is associated with a MCS of each user device. At block 1816, BFC is transmitted to each user device. The transmission may be made according to timing that allows use of the transmitted BFC in place of TC in each user device's MCS. Thus, responsive to the end of TC in the MCS, the presentation of BFC may cease and the MCS is rejoined. In some examples, presentation of the BFC may be ceased in concert with the end of the commercial, ad, other undesirable content (i.e., the BFC may be ceased immediately upon conclusion of the commercial, ad, other undesirable content) and presentation of the MCS may be resumed without delay. In other examples, presentation of the BFC may be ceased upon completion of a clip or other logical break in the BFC content (e.g., the BFC may be ceased gracefully) and the presentation of the MCS may be resumed with a slight delay (e.g., the period between when the commercial, ad, or other undesirable content ended and the completion of the clip or other logical break in the BFC content). If the BFC is allowed to conclude gracefully, it may be impossible to return to the MCS immediately after the TC is removed. Accordingly, the MCS is buffered for the user, while the BFC plays to conclusion. The MCS is then rejoined with a slight delay, that is, the user may watch the MCS slightly behind other uses. However, the user will catch up, when additional TC is removed from the MCS, and will have less BFC. For example, if the user's BFC is allowed to overrun the end of the TC by 30 seconds (due to user election), and later two minutes of TC is identified, the user may receive only 90 seconds of BFC and will thereby "catch up" to the MCS.

Further Example Methods

A method of providing backfill content (BFC), comprises: under control of one or more processors configured with executable instructions: obtaining metadata (MD) indicating locations of trim content (TC) in a main content stream (MCS) of each of a plurality of users; generating BFC for each of the plurality of users based at least in part on each user's MD and MCS; and transmitting BFC to each user according to timing that allows use of the transmitted BFC in place of TC in each user's MCS.

A method of providing backfill content (BFC) to a plurality of users, comprising: under control of one or more processors configured with executable instructions: receiving an indication of a main content stream (MCS) used by each of the plurality of users; sending metadata (MD) to each of the plurality of users, the MD indicating locations of trim content (TC) in the MCS of each of the plurality of users generating BFC for each of the plurality of users based at least in part on each user's MD and MCS; and transmitting the BFC, generated for each user, to each user, according to timing that allows use of the transmitted BFC in place of TC in each user's MCS.

A method of providing backfill content (BFC) and metadata (MD) to each of a plurality of user devices, comprising: under control of one or more processors configured with executable instructions: obtaining metadata (MD) in real time for each of a plurality of main content streams (MCS), wherein the MD indicates locations of trim content (TC) in each MCS; receiving an indication of a MCS used by each of the plurality of user devices; obtaining fantasy sports information (FSI) associated with users of each of the plurality of user devices; generating BFC for each of the plurality of user devices based at least in part on each user's FSI and TC in a MSC of each respective user device; sending metadata (MD) to each of the plurality of user devices, the sent MD is associated with a MCS of each user device; and transmitting BFC to each user device, according to timing that allows use of the transmitted BFC in place of TC in each user device's MCS.

The method wherein: receiving the indication of MCSs used by each of the plurality of user devices involves transmission of a message from each user device to a BFC provider that allows identification of a game tuned by the user device.

The method, wherein: obtaining FSI comprises obtaining information about athletes of interest to each user, including athletes on users' fantasy teams, fantasy team game opponents, or fantasy team league opponents.

The method, wherein generating BFC for each of the plurality of user devices comprises: generating video segments depicting athletes performing acts that resulted in fantasy sports points.

The method, additionally comprising: generating additional MD, wherein the additional MD comprises information assistive to generate audio/video segments, for use as BFC, using programming available to a user, wherein the segments are illustrative of athletes earning fantasy points of interest to the user; and sending the additional MD to devices of users having access to content streams to which the additional MD is applicable.

The method, additionally comprising: generating additional MD, wherein the additional MD comprises information assistive to generate audio/video segments, for use as BFC, using programming available to a user, wherein the segments comprise highlights of a game available to the user as an alternative MCS; and sending the additional MD to devices of users having access to the alternative MCS.

The method, additionally comprising: receiving information from individual users identifying how to define TC within a MCS for MD generation, wherein the received information defines TC to include commercial messages and at least some non-commercial content, the non-commercial content based on factors comprising: whether a game clock is moving; and/or whether players are in a huddle.

The method, additionally comprising: receiving information from individual users assistive to define what BFC each would like.

The method, additionally comprising: receiving information from individual users indicating if they would prefer to receive BFC or go to a commercial message within the MCS.

The method, additionally comprising: receiving information from individual users indicating if they would accept some delay in display of the MCS in exchange for BFC that does not conveniently fit into commercial breaks in the MCS.

The method, additionally comprising: a default, but user-alterable, definition for TC as including only commercials identified within the MCS; a default, but user-alterable, definition for BFC as comprising fantasy sports information; and a default, but user-alterable, limitation on delay to the MCS resulting from MD generation and BFC presentation.

The method, additionally comprising: receiving information from users indicating a preferred BFC provider to which each respective user would like to subscribe; wherein generating BFC for each of the plurality of user devices comprises generating copies of BFC masters sent by preferred BFC providers.

The method, wherein: the MD sent to each of the plurality of user devices is assistive to control whether the user's device displays the MCS or the BFC.

The method, wherein: the MD sent to each of the plurality of user devices is assistive to control a delay of the MCS relative to a network broadcast of the same MCS.

The method, wherein: the MD sent to each of the plurality of user devices is assistive to regulate buffering of the MCS if BFC overruns a commercial set of the MCS.

The method, additionally comprising: sending metadata to a user device based at least in part on a secondary content stream available to the user device; wherein the sent metadata is sufficient to direct segmentation of the secondary content stream into backfill content for display at the user device.

The method, additionally comprising: providing a user interface to receive input regarding transmission of backfill content between two users.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Various examples are described herein. In some instances, the examples are described individually. However, the examples described herein are usable in combination with one another. Thus, while two examples may be described separately, Applicant contemplates that the examples are usable together. For instance, while various user interfaces are described individually, the user interfaces may be used in combination with each other, may be combined with each other or other user interfaces, and/or may be modified (e.g., for use with other types of content) to achieve the various examples and implementations described herein.

Moreover, the techniques described in this application may be used alone or in combination with the examples and techniques described in U.S. patent application Ser. No. 14/550,906, filed on Nov. 21, 2014, and/or U.S. patent application Ser. No. 14/285,607, filed on May 22, 2014, both of which are incorporated herein by reference. For instance, techniques described in U.S. patent application Ser. No. 14/285,607 for segmenting, tagging/annotating, interleaving, and serving custom content may be used to provide the BFC described in this application. Additionally or alternatively, tagging/annotating techniques described in U.S. patent application Ser. No. 14/285,607 may be used to provide the metadata in order to determine the trim content to be removed from the MCS as described in this application.

What is claimed is:

1. A computing device comprising:
   one or more processors;
   one or more communication connections receiving content, including a main content stream and a secondary content stream, from one or more content sources;
   a port for outputting the main content stream to a display screen of a user; and
   memory storing instructions executable by the one or more processors to perform operations comprising:
      querying one or more user settings;
      buffering the main content stream;
      outputting the buffered main content stream according to a delay, for display on the display screen of the user;
      segmenting the secondary content stream into multiple content segments, based at least in part on the user settings;
      receiving metadata identifying a commercial or other trim content currently within the buffered main content stream and having a presentation time that is within a period defined by the delay;
      using the metadata to determine backfill content to replace the identified commercial or other trim content;
      responsive to the metadata indicating the identified commercial or other trim content:
         ceasing to output the main content stream to the display screen of the user; and
         outputting the backfill content to the display screen of the user in lieu of the identified commercial or other trim content of the main content stream, wherein:
            the backfill content is based at least in part on a fantasy sports account of the user that indicates one or more athletes of interest to the user and based at least in part on the multiple content segments; and
            the backfill content comprises information about the one or more athletes of interest to the user;
      recognizing an end of the commercial or other trim content; and
      responsive to the end of the commercial or other trim content:
         ceasing to output the backfill content to the display screen of the user; and
         resuming output of the main content stream to the display screen of the user.

2. The computing device of claim 1, wherein the trim content comprises content identified as being undesirable to the user.

3. The computing device of claim 1, the operations further comprising transmitting, via the one or more communication connections, the multiple content segments to one or more other devices for use as backfill content by the one or more other devices.

4. A method of providing backfill content, comprising:
under control of one or more processors configured with executable instructions:
determining a main content stream to be output for presentation on a display screen of a user;
determining a secondary content stream;
querying one or more user settings;
buffering the main content stream for display on the display screen of the user according to a delay;
segmenting the secondary content stream into multiple content segments, based at least in part on the user settings;
receiving metadata identifying a commercial or other trim content currently within the buffered main content stream and having a presentation time that is within a period defined by the delay;
obtaining backfill content for the user based at least in part on a length of the commercials or other trim content as indicated by the metadata, wherein the backfill content includes at least some of the multiple content segments; and
outputting the backfill content for presentation on the display screen of the user in place of the commercials or other trim content trimmed from the main content stream, wherein:
the backfill content is based at least in part on a fantasy sports account of the user that indicates one or more athletes of interest to the user; and
the backfill content comprises information about the one or more athletes of interest to the user.

5. The method of providing backfill content of claim 4, wherein the one or more processors under control of which the method is performed comprise part of a game box, satellite receiver, cable box, or other computing device of the user, which is local to the display screen of the user.

6. The method of providing backfill content of claim 5, further comprising:
outputting the main content stream on the display screen of the user;
determining existence of a commercial or ad in the main content stream based at least in part on metadata received from a remote computing device indicating existence of the commercial or ad;
responsive to the commercial or ad:
ceasing to output the main content stream;
determining an end of the commercial or ad based at least in part on the metadata; and
responsive to the end of the commercial or ad:
ceasing to output the backfill content; and
resuming outputting the main content stream.

7. The method of providing backfill content of claim 4, wherein the one or more processors under control of which the method is performed comprise part of one or more servers, which are remote from the display screen of the user.

8. The method of providing backfill content of claim 4, further comprising:
obtaining one or more user settings by querying a fantasy sports platform of the user; and
using the one or more user settings to configure the backfill content.

9. The method of providing backfill content of claim 4, wherein the backfill content comprises video content to which the user has a subscription.

10. The method of providing backfill content of claim 4, wherein the trim content comprises content identified as being undesirable to the user.

11. The method of providing backfill content of claim 4, further comprising:
receiving a secondary content stream; and
segmenting the secondary content stream into multiple content segments, based at least in part on the fantasy sports account of the user, at least some of the multiple content segments being for use as at least part of the backfill content.

12. The method of providing backfill content of claim 4, further comprising:
generating backfill content for multiple other users based at least in part on main content streams to be viewed by the multiple other users, metadata related to the main content streams to be viewed by the multiple other users, and interest information of the multiple other users, the backfill content for at least some of the multiple other users including content relating to the interest information of the multiple other users; and
outputting the backfill content for presentation by computing devices of the multiple other users.

13. A method of outputting backfill content in lieu of portions of a main content stream, the method comprising:
receiving content, including the main content stream and a secondary content stream, from one or more content sources;
querying one or more user settings;
buffering the main content stream into a buffer;
segmenting the secondary content stream into multiple content segments, based at least in part on the user settings;
obtaining backfill content of interest to a user;
outputting the main content stream from the buffer according to a delay, for display of the main content stream on a screen of the user;
receiving metadata identifying a commercial or other trim content currently within the buffered main content stream and having a presentation time that is within a period defined by the delay;
responsive to receiving the metadata identifying the trim content in the main content stream:
ceasing to output the main content stream; and
outputting backfill content in lieu of the main content stream, wherein:
the backfill content is based at least in part on a fantasy sports account of the user that indicates one or more athletes of interest to the user and based at least in part on the multiple content segments; and
the backfill content comprises information about the one or more athletes of interest to the user;
receiving metadata identifying an end to the trim content, the metadata having been generated during the delay, wherein the metadata includes timing data to transition between the backfill content and the main content stream; and
responsive to receiving the metadata identifying an end of the trim content:
ceasing to output the backfill content; and
resuming outputting the main content stream.

14. The method of claim 13, further comprising:
receiving metadata from a metadata provider; and
wherein the metadata provider scanned the main content stream and determined start and endpoints of commercials.

15. The method of claim 13, wherein the trim content comprises at least one of:
   periods in the main content stream of commercials or ads; or
   content identified as being undesirable to the user.

16. The method of claim 13, wherein the trim content comprises periods in the main content stream indicated by one or more conditions identified in one or more user settings.

17. The method of claim 13, wherein the backfill content comprises content from a backfill content provider identified in one or more user settings.

18. The method of claim 13, wherein the backfill content additionally comprises video content depicting a topic of interest to the user identified in one or more user settings.

19. The computing device of claim 1, wherein:
   the metadata was generated by a metadata provider for use by a device of the user;
   the backfill content was generated by a backfill content provider for display by the device of the user; and
   the main content stream was generated by a content provider for display by the device of the user;
   wherein the metadata provider, the backfill content provider and the content provider are different entities.

* * * * *